United States Patent
Krieger et al.

(10) Patent No.: US 12,288,217 B1
(45) Date of Patent: Apr. 29, 2025

(54) SYSTEMS AND METHODS FOR DEVELOPING AN OPTIMIZED DEBT SERVICE STRATEGY UTILIZING PRODUCTS ACROSS MULTIPLE CATEGORIES

(71) Applicant: Wells Fargo Bank, N.A., San Francisco, CA (US)

(72) Inventors: Justin Morris Krieger, Saint Louis, MO (US); Jane Turpin, Waukee, IA (US); Shahyar Taheri, Waxhaw, NC (US); Tobias Harting, Novato, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 95 days.

(21) Appl. No.: 18/048,795

(22) Filed: Oct. 21, 2022

(51) Int. Cl.
*G06Q 20/42* (2012.01)
(52) U.S. Cl.
CPC .................................. *G06Q 20/42* (2013.01)
(58) Field of Classification Search
None
See application file for complete search history.

(56) References Cited

U.S. PATENT DOCUMENTS

| | | | |
|---|---|---|---|
| 8,533,092 B1 * | 9/2013 | Burrow | G06Q 40/02 705/37 |
| 11,145,005 B2 * | 10/2021 | Brock | G06Q 20/108 |
| 11,544,780 B2 * | 1/2023 | Ben David | G06N 20/00 |
| 2007/0156552 A1 | 7/2007 | Manganiello | |
| 2009/0030819 A1 * | 1/2009 | VanLeeuwen | G06Q 40/02 705/30 |
| 2014/0136381 A1 | 5/2014 | Joseph et al. | |
| 2016/0232546 A1 * | 8/2016 | Ranft | G06Q 30/0206 |
| 2020/0074539 A1 * | 3/2020 | Palaghita | G06Q 40/03 |
| 2020/0082444 A1 * | 3/2020 | Benkreira | G06Q 20/405 |
| 2020/0090264 A1 | 3/2020 | O'Brien | |
| 2020/0302525 A1 | 9/2020 | Cella | |
| 2020/0387965 A1 * | 12/2020 | Cella | G06Q 10/0639 |

* cited by examiner

*Primary Examiner* — Paul S Schwarzenberg
(74) *Attorney, Agent, or Firm* — K&L Gates LLP

(57) ABSTRACT

Systems, apparatuses, methods, and computer program products are disclosed for developing an optimized debt service strategy solution utilizing products across multiple product categories. An example method includes receiving, by communications hardware, a user dataset. The example method also includes processing, by surrogate modeling circuitry, the user dataset using a plurality of surrogate models. The example method also includes generating, by the surrogate modeling circuitry and based on the processing of the user dataset, a parameter estimation set. The example method also includes determining, by optimizer modeling circuitry and based on the user dataset and the parameter estimation set, at least one debt service strategy solution comprising at least one product of a first product category from a plurality of products associated with multiple product categories. The example method also includes causing presentation, by communications hardware, of the at least one debt service strategy solution.

20 Claims, 14 Drawing Sheets

SYSTEMS AND METHODS FOR DEVELOPING AN OPTIMIZED DEBT SERVICE STRATEGY UTILIZING PRODUCTS ACROSS MULTIPLE CATEGORIES

BACKGROUND

Managing a range of debt obligations and determining optimal strategies for debt repayment can be an exhaustive task for individuals to perform. For instance, considering the wealth of available options, it may be extremely difficult or even impossible for an individual to determine the best possible solution to effectively manage debt.

BRIEF SUMMARY

Individuals may turn to digital services to assist with debt management. However, existing digital services are often one-dimensional and may only recommend one type of product as a solution. Further, existing digital services fail to take certain needs of the individual into account when determining solutions and fail to explore additional possibilities for debt management that may be better suited for the particular financial situation of the individual.

Existing digital services related to assisting individuals with debt management often lack the ability to look across multiple product categories when determining an optimal solution for an individual. For instance, many existing services are configured to recommend one type of product that is selected from a plurality of options offered from different lenders (e.g., personal loans of varying terms offered by multiple different banks). However, while a personal loan may help an individual in some cases, a personal loan may not be the most optimal solution for the individual. For example, an individual may actually be better off utilizing a product other than a personal loan to help with debt relief, such as transferring a balance to a new credit card with introductory terms. Utilizing such a product may further reduce certain impacts of debt repayment (e.g., interest rates and/or total interest over time); however, using existing services, an individual may not be made aware of this option, as existing services are aimed at only recommending one type of product (e.g., personal loans).

Further, existing services may only analyze a base level of financial information about an individual and fail to account for certain personal constraints that the individual deems important to their financial situation. For example, existing services may not take a preferred monthly budget of an individual into account when recommending products and/or providing strategies related to debt management.

Accordingly, the inventors have realized that a need exists for new solutions that improve upon traditional tools for providing debt management strategies and solutions. Example systems, methods, and computer program products are provided that develop an optimized debt service strategy solution utilizing products across multiple categories. To do this, example embodiments leverage a suite of trained surrogate models to estimate various parameters regarding an individual and in turn produced an optimized debt service strategy solution that adheres to user-defined constraints. Accordingly, example embodiments deliver high quality advice to individuals regarding new products and/or any adjustments to make to their existing credit products in order to consolidate debt and reduce interest costs, while also taking into consideration the customer's financial situation and various budgetary constraints that may not otherwise be readily identifiable from base-level financial information.

As described in greater detail below, example embodiments are able to, in real-time, solve for adjustments to be made to an individual's credit products, including a potential addition of new products, which result in having the greatest reduction in the total interest expense for the individual subject to any constraints, such as an amount the individual is able to dedicate to debt service. Such embodiments are able to operate at scale to bring high quality and bespoke debt service strategy solutions to the population at large. Whereas existing approaches are often inflexible and force individuals into particular products and generic recommendations, example embodiments are able to analyze an array of products over multiple product categories to determine a debt service strategy solution that can be best managed by the individual and also puts the individual in the most optimal financial position.

In one example embodiment, a method is provided for developing an optimized debt service strategy solution utilizing products across multiple product categories. The method includes receiving, by communications hardware, a user dataset. The method also includes processing, by surrogate modeling circuitry, the user dataset using a plurality of surrogate models. The method also includes generating, by the surrogate modeling circuitry and based on the processing of the user dataset, a parameter estimation set. The method also includes determining, by optimizer modeling circuitry and based on the user dataset and the parameter estimation set, at least one debt service strategy solution comprising at least one product of a first product category from a plurality of products associated with multiple product categories. The method also includes causing presentation, by communications hardware, of the at least one debt service strategy solution.

In another example embodiment, an apparatus is provided for developing an optimized debt service strategy solution utilizing products across multiple product categories. The apparatus includes communications hardware configured to receive a user dataset. The apparatus also includes surrogate modeling circuitry configured to process the user dataset using a plurality of surrogate models. The surrogate modeling circuitry is further configured to generate, based on the processing of the user dataset, a parameter estimation set. The apparatus also includes optimizer modeling circuitry configured to determine, based on the user dataset and the parameter estimation set, at least one debt service strategy solution comprising at least one product of a first product category from a plurality of products associated with multiple product categories. The communications hardware is further configured to cause presentation of the at least one debt service strategy solution.

In another example embodiment, a computer program product is provided for developing an optimized debt service strategy utilizing products across multiple product categories. The computer program product includes at least one non-transitory computer-readable storage medium storing software instructions that, when executed, cause an apparatus to receive a user dataset. The software instructions, when executed, further cause the apparatus to process the user dataset using a plurality of surrogate models. The software instructions, when executed, further cause the apparatus to generate, based on the processing of the user dataset, a parameter estimation set. The software instructions, when executed, further cause the apparatus to determine, based on the user dataset and the parameter estimation set, at least one debt service strategy solution comprising at least one product of a first product category from a plurality of products associated with multiple product categories. The software instructions, when executed, further cause the apparatus to cause presentation of the at least one debt service strategy solution.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIGS. 5A, 5B, 5C, and 5D illustrate example views of an interactive user interface that may be presented to a user to facilitate the acquisition of various user data of a user dataset, in accordance with some example embodiments described herein.

FIGS. 8A, 8B, and 8C illustrate example views of an interactive user interface that may be presented to a user and display one or more debt service strategy solutions, in accordance with some example embodiments described herein.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

Figure 1:
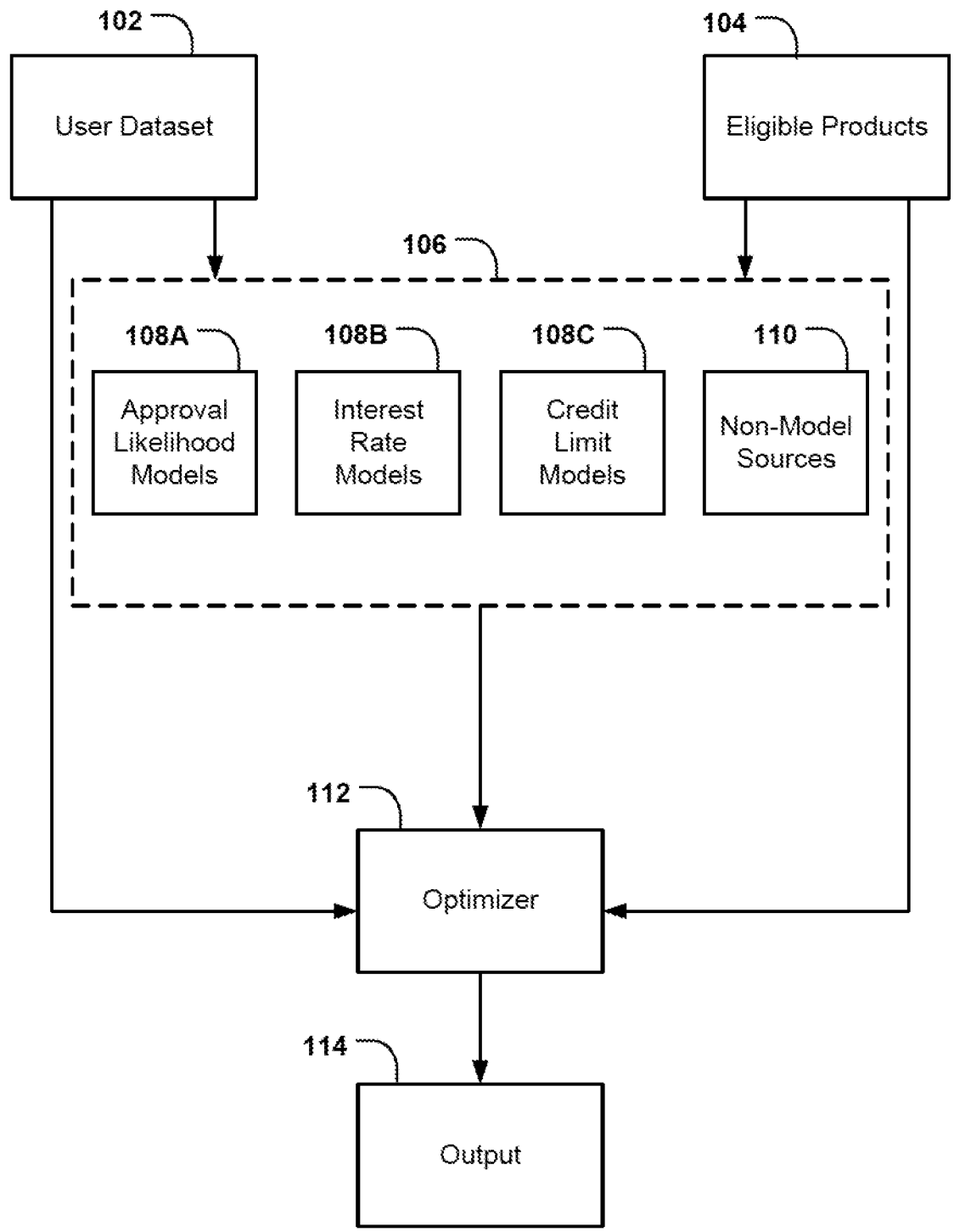
FIG. 1 illustrates an example schematic flow diagram of how a debt service strategy solution may be developed in accordance with some example embodiments described herein.

As noted previously, example embodiments described herein provide methods, apparatuses, systems, and computer program products for developing an optimized debt service strategy solution utilizing products across multiple product categories. As the schematic flow diagram in FIG. 1 illustrates, example embodiments may receive a user dataset 102 comprising collected user data 102 (which may include user financial information as well as various constraint factors) collected from direct user input with an interactive user interface (UI) and additionally from a variety of third-party data sources. The user dataset (along with eligible product information 104) may then be processed using a plurality of tools 106 that may include a plurality of surrogate models 108A-108C and non-model sources 110 to determine a parameter estimation set. The parameter estimation set may comprise a plurality of estimated values regarding various financial parameters (e.g., credit line limits, approval likelihood, interest rates, etc.) of a plurality of products as they relate to the particular user. Values for the parameters of the parameter estimation set may be estimated by providing the user dataset to the plurality of surrogate models 108A-108C that are trained to estimate such variables. For instance, the surrogate models may be trained on historical data pertaining to other users who utilized (or, in some cases, were not approved for) certain products such that the surrogate models are able to predict an approval likelihood of a certain product for the user, and/or other variables such as an estimated credit limit (e.g., pertaining to credit card products), estimated interest rate, etc. As shown in FIG. 1, the surrogate models may be categorized into approval likelihood models 108A, interest rate models 108B, credit limit models 108C. Advantageously, the surrogate models do not replicate existing underwriting and/or approval processes. In this regard, by leveraging historical data and using approximations for variables such as interest rates and credit limits, certain regulatory issues are avoided that could otherwise trigger the need for communication of certain disclosures and/or documents to users (e.g., Regulation B disclosures or the like). In addition to surrogate models 108A-C, non-model sources 110 (further described herein) may also be utilized to determine various parameter values. Non-model sources 110 may include connected services and/or systems from which data can be pulled to gather various parameter values.

In various embodiments, the parameter estimation set and the user dataset may then be provided to an optimizer model 112 that iterates through a heterogeneous product set in view of the estimated variables as well as the constraint factors provided in the user dataset to determine output 114 in the form of at least one debt service strategy solution for the user. The debt service strategy solution may comprise a recommendation for a new product and/or an adjustment to existing credit products belonging to the user. In either case, the debt service strategy solution comprises the most optimal solution for the user over all other possible solutions (e.g., the lowest cost solution for the user in which the decision variables include the payments made and the principal on the product). For instance, a new product may be used to consolidate some or all existing debts of the user. The optimizer model may prioritize from among all potential credit products which should be considered first by the user. The optimizer model may estimate a savings amount as well as an approval likelihood (e.g., gathered from the parameter estimation set) for the product as part of the considerations for prioritization. The optimizer model may also take into consideration use of existing products, partial repayment of existing products, a fixed customer budget, and/or use of existing savings when determining an optimal debt service strategy solution that may include a recommendation for a new product.

In contrast to conventional services for debt management, example embodiments described herein provide automated, systematic, yet personalized, process that produces consistent and reliable debt service strategy solutions. Because this systematic solution minimizes the manual effort historically required, it permits greater scalability and allows cross-product debt management services to be offered to a mass market audience. Moreover, by avoiding any direct human involvement from the development of the debt service strategy solutions, example embodiments minimize the likelihood that the recommendations will be the product of improper bias. Accordingly, example embodiments utilize a technical and automated approach that can offer debt relief solutions in essentially real-time, while also minimizing any requirements for manual effort.

Although a high-level explanation of the operations of example embodiments has been provided above, specific details regarding the configuration of such example embodiments are provided below.

System Architecture

Figure 2:
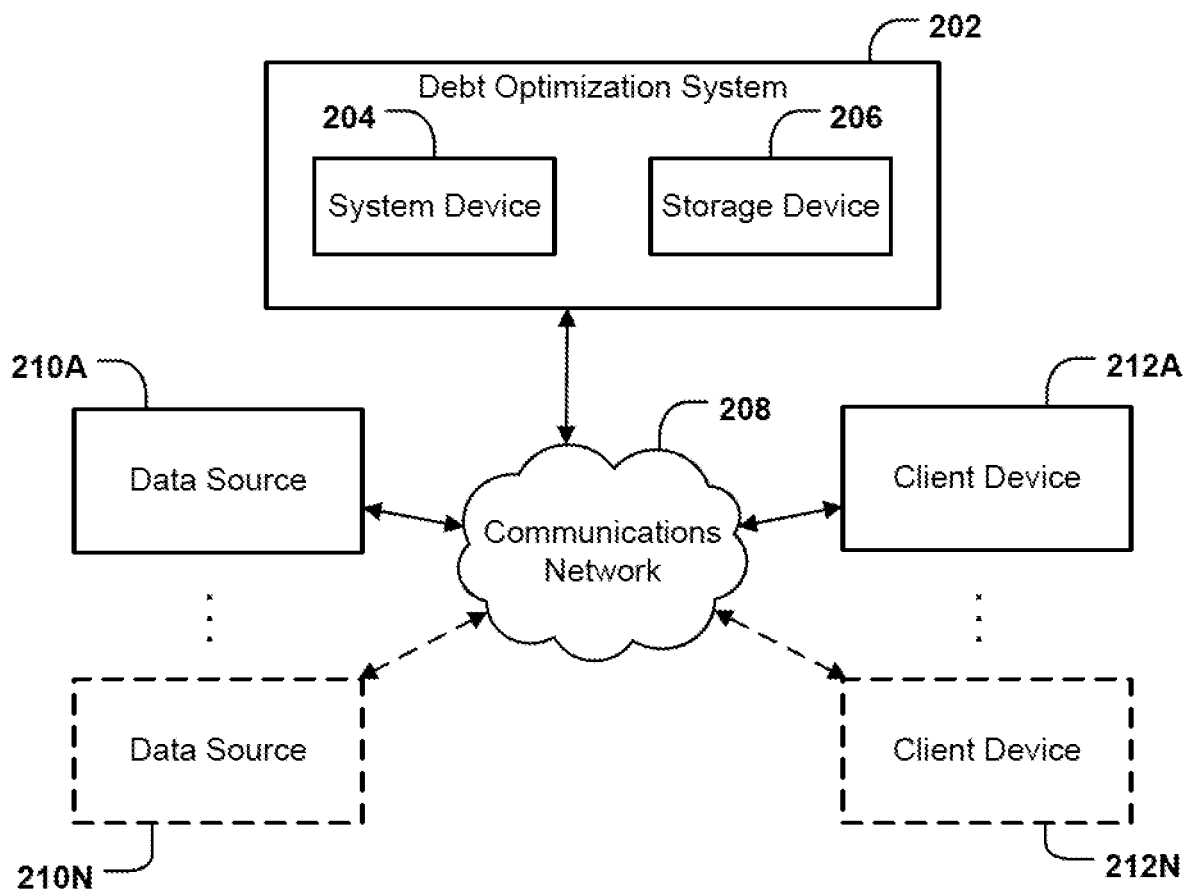
FIG. 2 illustrates a system in which some example embodiments may be used for developing an optimized debt service strategy solution.

Example embodiments described herein may be implemented using any of a variety of computing devices or servers. To this end, FIG. 2 illustrates an example environment within which embodiments of the present disclosure may operate. As illustrated, a debt optimization system 202 may include a system device 204 in communication with a storage device 206. Although system device 204 and storage device 206 are described in singular form, some embodiments may utilize more than one system device 204 and/or more than one storage device 206. Additionally, some embodiments of the debt optimization system 202 may not require a storage device 206 at all. Whatever the implementation, the debt optimization system 202 and its constituent system device(s) 204 and/or storage device(s) 206 may receive and/or transmit information via communications network 208 (e.g., the Internet) with any number of other devices and/or systems, such as any of data sources 210A through 210N and/or client devices 212A through 212N.

System device 204 may be implemented as one or more servers, which may or may not be physically proximate to other components of the debt optimization system 202. Furthermore, some components of system device 204 may be physically proximate to the other components of the financial health evaluation system 202 while other components are not. System device 204 may receive, process, generate, and transmit data, signals, and electronic information to facilitate the operations of the debt optimization system 202. Particular components of system device 204 are described in greater detail below with reference to apparatus 300 in connection with FIG. 3.

Storage device 206 may comprise a distinct component from system device 204 or may comprise an element of system device 204 (e.g., memory 304, as described below in connection with FIG. 3). Storage device 206 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 208). Storage device 206 may host the software executed to operate the system device 204 and/or any other elements hosted by the debt optimization system 202. Storage device 206 may store information relied upon during operation of the debt optimization system 202, such as data comprising a plurality of trained models utilized by the debt optimization system 202 to eventually produce debt service strategy solutions, and which may also include data comprising financial information about one or more individuals to be evaluated by the debt optimization system 202.

The debt optimization system 202 may interact with a plurality of data sources 210A-210N in order to obtain various information, and these data sources 210A-210N may be embodied by any computing devices known in the art, such as servers, desktop or laptop computers, tablet devices, smartphones, or the like. Similarly, individuals may interact directly with the debt optimization system 202 in some embodiments, and such individuals will be associated with one or more of the client devices 212A-212N, which may also be embodied by any computing devices known in the art, such as desktop or laptop computers, tablet devices, smartphones, or the like.

As set forth herein, FIG. 2 illustrates an environment and implementation in which the debt optimization system 202 interacts with one or more of data sources 210A-210N and one or client devices 212A-212N. It will be understood that a user may directly interact with the debt optimization system 202 (e.g., via communications hardware of system device 204), or may also interact with the debt optimization system 202 via a client device 212A-212N (or via another separate device not shown in FIG. 2), and may thereby communicate with, operate, control, modify, or otherwise interact with the debt optimization system 202 either directly or via a separate device.

Example Implementing Apparatuses

Figure 3:
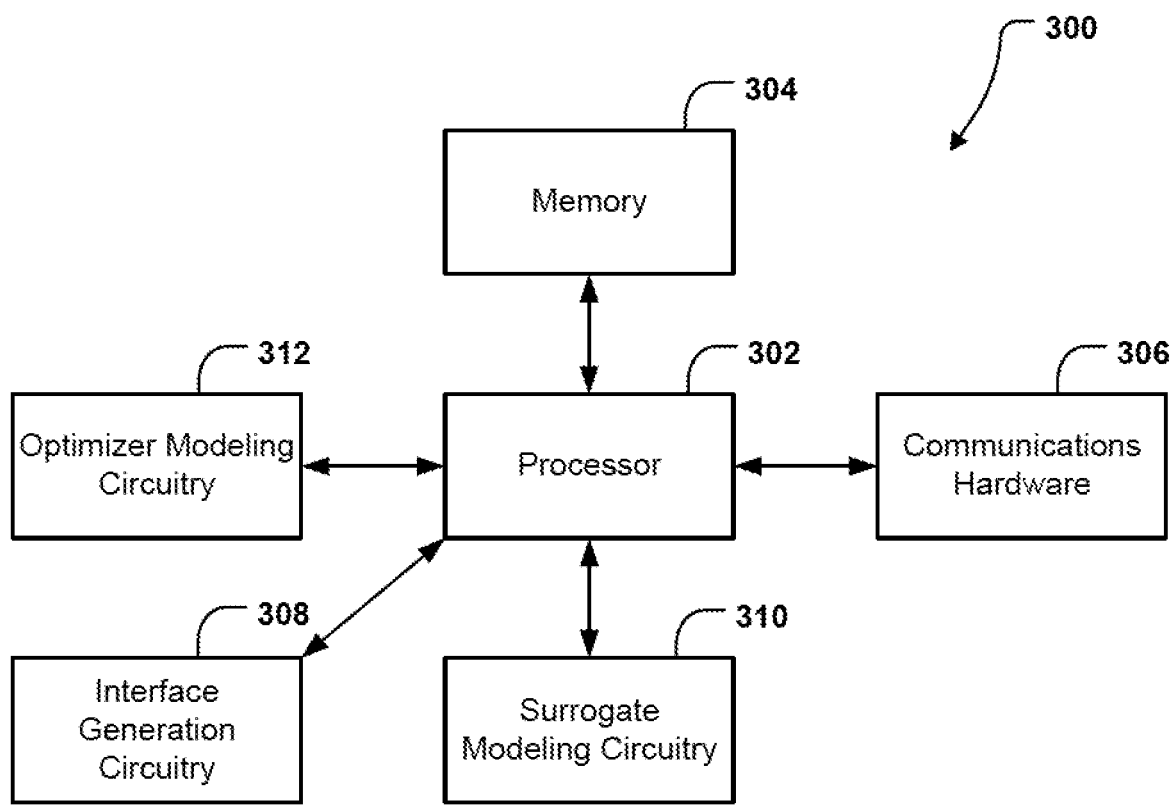
FIG. 3 illustrates a schematic block diagram of example circuitry embodying a device that may perform various operations in accordance with some example embodiments described herein.

System device 204 of the debt optimization system 202 may be embodied by one or more computing devices or servers, shown as apparatus 300 in FIG. 3. As illustrated in FIG. 3, the apparatus 300 may include processor 302, memory 304, communications hardware 306, interface generation circuitry 308, surrogate modeling circuitry 310, and optimizer modeling circuitry 312, each of which will be described in greater detail below. While the various components are only illustrated in FIG. 3 as being connected with processor 302, it will be understood that the apparatus 300 may further comprises a bus (not expressly shown in FIG. 3) for passing information amongst any combination of the various components of the apparatus 300. The apparatus 300 may be configured to execute various operations described above in connection with FIG. 2 and below in connection with FIGS. 4, 6, and 7.

The processor 302 (and/or co-processor or any other processor assisting or otherwise associated with the processor) may be in communication with the memory 304 via a bus for passing information amongst components of the apparatus. The processor 302 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 300, remote or "cloud" processors, or any combination thereof.

The processor 302 may be configured to execute software instructions stored in the memory 304 or otherwise accessible to the processor (e.g., software instructions stored on a separate storage device 206, as illustrated in FIG. 2). In some cases, the processor may be configured to execute hard-coded functionality. As such, whether configured by hardware or software methods, or by a combination of hardware with software, the processor 302 represent an entity (e.g., physically embodied in circuitry) capable of performing operations according to various embodiments of the present invention while configured accordingly. Alternatively, as another example, when the processor 302 is embodied as an executor of software instructions, the software instructions may specifically configure the processor 302 to perform the algorithms and/or operations described herein when the software instructions are executed.

Memory 304 is non-transitory and may include, for example, one or more volatile and/or non-volatile memories. In other words, for example, the memory 304 may be an electronic storage device (e.g., a computer readable storage medium). The memory 304 may be configured to store information, data, content, applications, software instructions, or the like, for enabling the apparatus to carry out various functions in accordance with example embodiments contemplated herein.

The communications hardware 306 may be any means such as a device or circuitry embodied in either hardware or a combination of hardware and software that is configured to receive and/or transmit data from/to a network and/or any other device, circuitry, or module in communication with the apparatus 300. In this regard, the communications hardware 306 may include, for example, a network interface for enabling communications with a wired or wireless communication network. For example, the communications hardware 306 may include one or more network interface cards, antennas, buses, switches, routers, modems, and supporting hardware and/or software, or any other device suitable for enabling communications via a network. Furthermore, the communications hardware 306 may include the processor for causing transmission of such signals to a network or for handling receipt of signals received from a network.

The communications hardware 306 may also be configured to provide output to a user and, in some embodiments, to receive an indication of user input. The communications hardware 306 may comprise an interface, such as a display, and may further comprise the components that govern use of the interface, such as a web browser, mobile application, dedicated client device, or the like. In some embodiments, the communications hardware 306 may include a keyboard, a mouse, a touch screen, touch areas, soft keys, a microphone, a speaker, and/or other input/output mechanisms.

The communications hardware 306 may utilize the processor 302 to control one or more functions of one or more of these interface elements through software instructions (e.g., application software and/or system software, such as firmware) stored on a memory (e.g., memory 304) accessible to the processor 302.

In addition, the apparatus 300 further comprises interface generation circuitry 308 that generates an interactive user interface (UI) comprising a plurality of UI elements. The interface generation circuitry 308 may utilize processor 302, memory 304, or any other hardware component included in the apparatus 300 to perform these operations, as described in connection with FIGS. 4, 6, and 7 below. The interface generation circuitry 308 may further utilize communications hardware 306 to gather data from a variety of sources (e.g., data sources 2110A-210N, client devices 212A-212N, and/or storage device 206, as shown in FIG. 1) and/or to receive data from a user, and in some embodiments may utilize processor 302 and/or memory 304 to configure and generate an interactive UI with which a user may interact to provide various financial information, as well as review and/or act upon any debt service strategy solutions determined by debt optimization system 202.

In addition, the apparatus 300 further comprises surrogate modeling circuitry 310 that processes a user dataset to generate a parameter estimation set and, in some embodiments, trains a variety of surrogate models using historical data. For example, a parameter estimation set may comprise one or more predicted outputs (e.g., estimated parameter values) based on data input to one or more surrogate models. The surrogate modeling circuitry 310 may utilize processor 302, memory 304, or any other hardware component included in the apparatus 300 to perform these operations, as described in connection with FIGS. 4, 6, and 7 below. In some embodiments, the surrogate modeling circuitry 310 may comprise multiple surrogate models, such as machine learning (ML) models (e.g., supervised or unsupervised), artificial intelligence (AI) reasoning models, logistic regression models, quantile regression models, and/or the like which are utilized to generate output data (e.g., a parameter estimation set) based on corresponding input data provided to the models. In some embodiments, example surrogate models of the surrogate modeling circuitry 310 may be trained using historical data (e.g., historical user financial data) collected by the debt optimization system 202. In some embodiments, example surrogate models of the surrogate modeling circuitry 310 may include an approval likelihood surrogate model set, an interest rate surrogate model set, and a credit limit surrogate model set, which are further described below.

In addition, the apparatus 300 further comprises optimizer modeling circuitry 312 that determines, based on a user dataset and a parameter estimation set, at least one debt service strategy solution comprising at least one product of a first product category from a plurality of products associated with multiple product categories. The optimizer modeling circuitry 312 may utilize processor 302, memory 304, or any other hardware component included in the apparatus 300 to perform these operations, as described in connection with FIGS. 4, 6, and 7 below. In some embodiments, the optimizer modeling circuitry 312 may a single model (or multiple models), such as an ML model (e.g., supervised or unsupervised), an AI reasoning model, and/or the like which are utilized to generate output data (e.g., one or more debt service strategy solutions) based on corresponding input data provided to the model.

Although components 302-312 are described in part using functional language, it will be understood that the particular implementations necessarily include the use of particular hardware. It should also be understood that certain of these components 302-312 may include similar or common hardware. For example, the interface generation circuitry 308, surrogate modeling circuitry 310, and optimizer modeling circuitry 312, may at times leverage use of the processor 302, memory 304, or communications hardware 306, such that duplicate hardware is not required to facilitate operation of these physical elements of the apparatus 300 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 300 to perform the various functions described herein.

Although the interface generation circuitry 308, surrogate modeling circuitry 310, and optimizer modeling circuitry 312 may leverage processor 302, memory 304, and/or communications hardware 306 as described above, it will be understood that each of these elements of apparatus 300 may include one or more dedicated processors, specially configured field programmable gate array (FPGA), or application specific interface circuit (ASIC) to perform its corresponding functions, and may accordingly leverage processor 302 executing software stored in a memory (e.g., memory 304), or memory 304 or communications hardware 306 for enabling any functions not performed by special-purpose hardware elements. In all embodiments, however, it will be understood that the interface generation circuitry 308, surrogate modeling circuitry 310, and optimizer modeling circuitry 312are implemented via particular machinery designed for performing the functions described herein in connection with such elements of apparatus 300.

In some embodiments, various components of the apparatus 300 may be hosted remotely (e.g., by one or more cloud servers) and thus need not physically reside on the apparatus 300. Thus, some or all of the functionality described herein may be provided by third party circuitry. For example, the apparatus 300 may access one or more third party circuitries via any sort of networked connection that facilitates transmission of data and electronic information between the apparatus 300 and the third-party circuitries. In turn, the apparatus 300 may be in remote communication with one or more of the other components describe above as comprising the apparatus 300.

As will be appreciated based on this disclosure, example embodiments contemplated herein may be implemented by apparatus 300. Furthermore, some example embodiments may take the form of a computer program product comprising software instructions stored on at least one non-transitory computer-readable storage medium (e.g., memory 304). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 300 as described in FIG. 3, that loading the software instructions onto a computing device or apparatus produces a special-purpose machine comprising the means for implementing various functions described herein.

Having described specific components of an example apparatus 300, example embodiments of the present disclosure are described below in connection with a series of graphical user interfaces and flowcharts.

Example Operations

Figure 4:
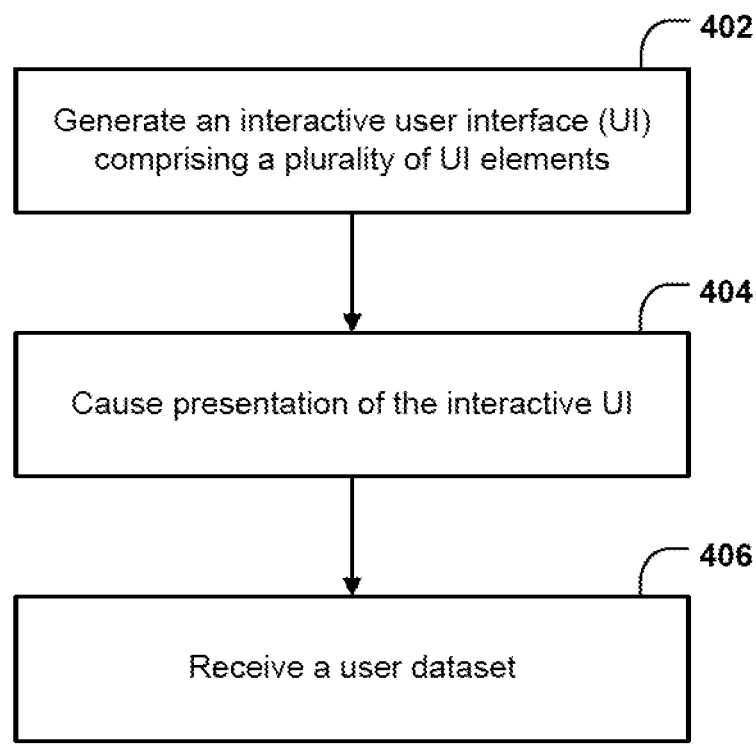
FIG. 4 illustrates an example flowchart for generating an interactive user interface and receiving a user dataset, in accordance with some example embodiments described herein.

In some embodiments, user interaction with the debt optimization system 202 may be facilitated through an interactive graphical user interface. Turning first to FIG. 4, example operations are shown for generating an interactive UI and receiving user information.

As shown by operation 402, the apparatus 300 includes means, such as processor 302, memory 304, interface generation circuitry 308, or the like, for generating an interactive user interface (UI) comprising a plurality of UI elements. In some embodiments, the interactive UI may be generated as part of a digital user experience (e.g., a Software-as-a-Service (SaaS) experience) that may be triggered by a user (e.g., via a client device 112A-112N). For instance, the interactive UI may be generated in response to a user interaction with an element of a website, mobile application, or the like that is configured to trigger a start of the digital user experience.

As shown by operation 404, the apparatus 300 includes means, such as processor 302, memory 304, communications hardware 306, or the like, for causing presentation of the interactive UI. For example, in some embodiments, the interactive UI may be transmitted and displayed via a display of a client device 112A-112N of the user. In some other embodiments, the interactive UI may be displayed directly via display of a computing device embodying apparatus 300.

The interactive UI may comprise a plurality of different views (e.g., screens) configured to allow a user to navigate through in order to review and provide various information. Turning briefly to FIG. 5A, an example initial view 500 of the interactive UI is shown which may be displayed at the beginning of the digital user experience. As shown, the initial view 500 may comprise general information relating to the digital user experience, such as a description of what the experience offers to the user. Additionally, the initial view 500 may request consent from the user to allow the debt optimization system 202 to perform a credit check on the user. In this regard, the user may select UI element 502A (e.g., a checkbox, radio button, or the like) to indicate consent to a credit check. The initial view 500 may also request that the user agree to various terms and conditions associated with the digital user experience. In this regard, the user may select UI element 502B to indicate agreement to terms and conditions.

The initial view 500 may also comprise a start button 502C that, when selected by the user, initiates a process of collecting user information via the interactive UI. In this regard, as shown by operation 406 in FIG. 4, the apparatus 300 includes means, such as processor 302, memory 304, communications hardware 306, or the like, for receiving a user dataset. The user dataset may comprise personal and financial information of the user and may be obtained through multiple sources. For example, a portion of data in the user dataset may be obtained via a soft credit pull from a data source 110A-110N (e.g., one or more credit bureaus). Such information may include a credit score for the user as calculated by one or more credit bureaus, as well as one or more accounts that are associated with the user.

Figure 5B:
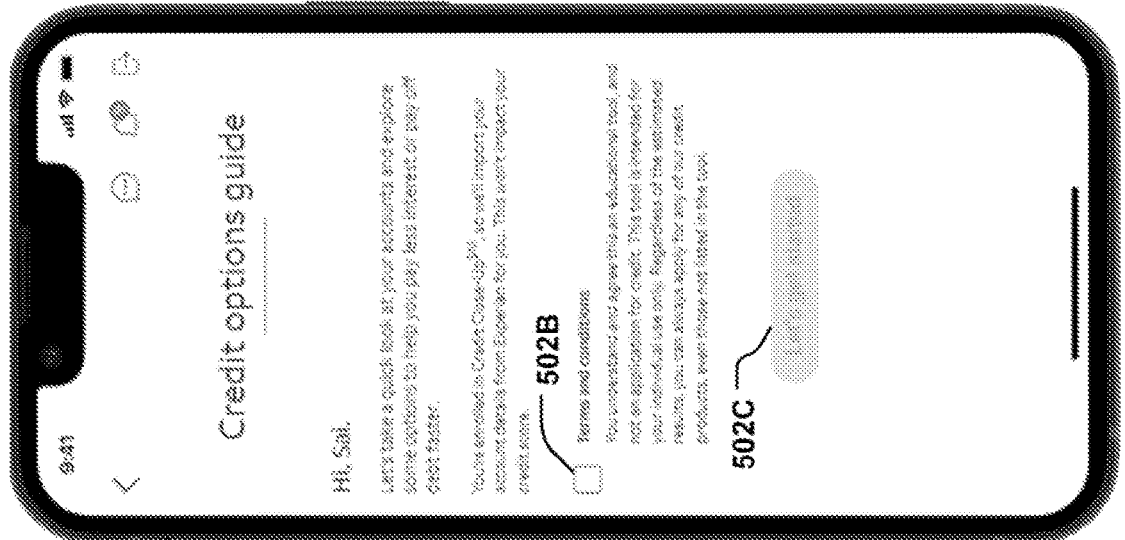
Figure 5A:
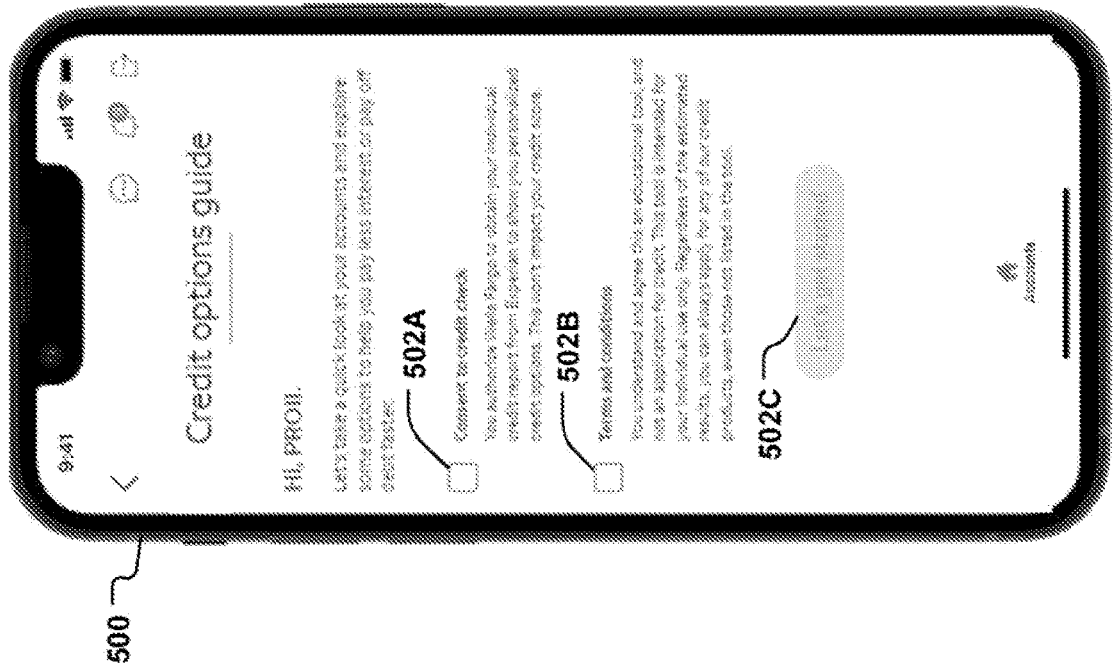

FIG. 5B shows an alternate version 501 of the initial view 500 where the user is already enrolled with a credit check service (e.g., Credit Close-Up℠ as shown in FIG. 5B). In alternate version 501 of the initial view 500, UI element 502A for indicating consent to a credit check (as shown in FIG. 5A) is removed because the user has already pre-authorized the credit check through being enrolled with the credit check service. As further shown in FIG. 5B, the alternate version 501 of the initial view 500 still includes the UI element 502B to indicate agreement to terms and conditions and the start button 502C shown in FIG. 5A.

Figure 5C:
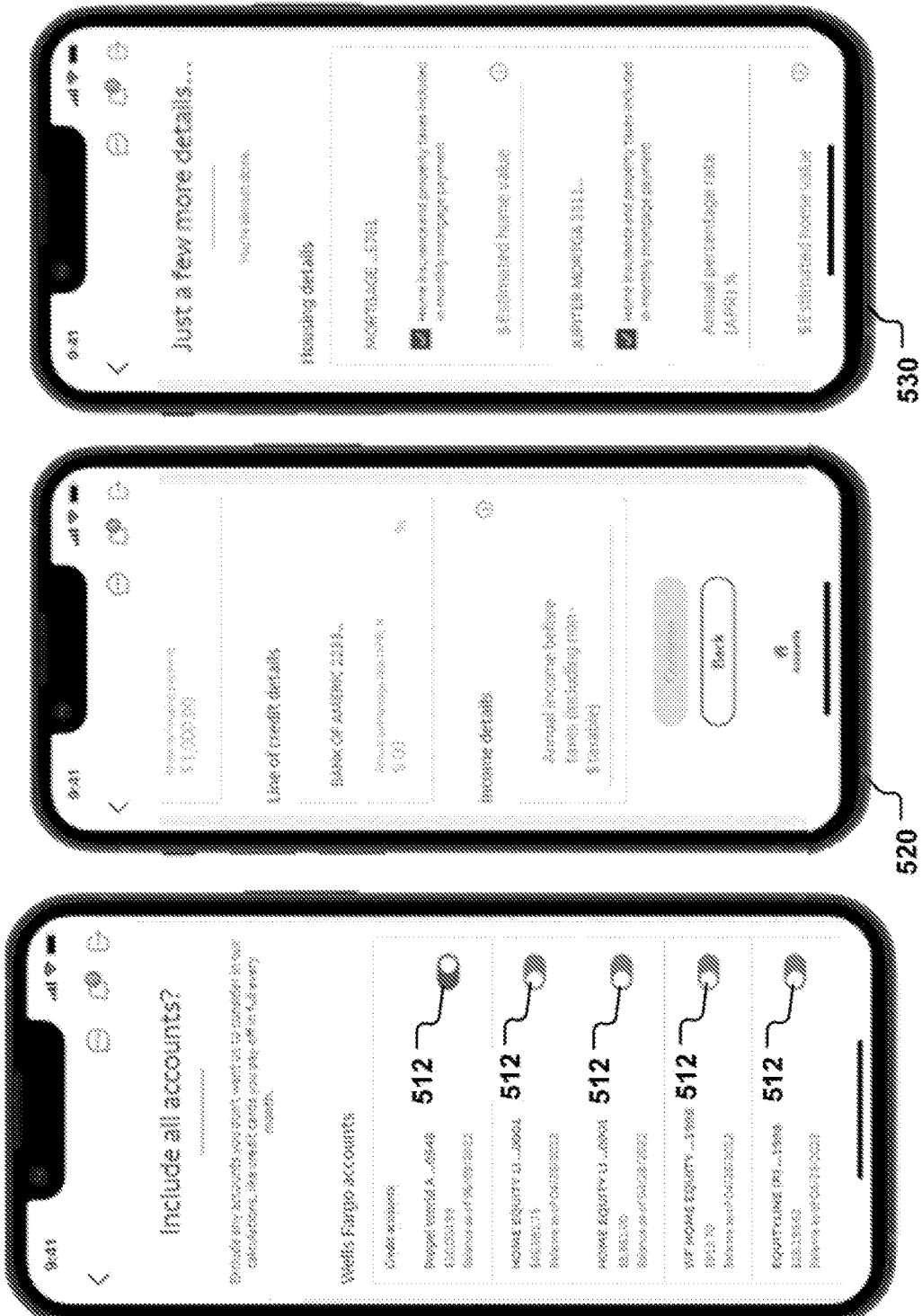

Additionally, portions of data in the user dataset may be obtained via user inputs to the interactive UI. Turning briefly to FIG. 5C, additional example views of the interactive UI are shown which present information to the user regarding various products (e.g., which may include existing debts) belonging to the user and allow the user to input additional information.

As shown in view 510, a listing of various products (e.g., credit accounts, mortgages, loans, etc.) may be displayed based on information collected from the credit pull performed for the user. The user may confirm certain products to be considered in the eventual determination of a debt strategy service solution or exclude certain products from consideration (i.e., the user can exclude products that they don't want the model(s) to consider when determining an optimal debt service strategy solution). A user may exclude certain products for a variety of reasons. For instance, the user may not have the ability to close the account(s) (e.g., they are only a co-signer), or for any other reason. For example, as shown in view 510, the user may toggle a button 512 next to each product listed, wherein right-toggled button (e.g., the top-most button 512) indicates an inclusion of the product and left-toggled button (e.g., all other buttons 512 aside from the top-most button 512) indicates an exclusion of the product.

After selecting which products to include or exclude, the interactive UI may display additional views (e.g., view 520 and view 530) which allows the user to provide necessary additional data related to certain products. While views 520 and 530 illustrate two examples of such views, it is to be appreciated that other views may be generated to collect additional data as necessary. As shown, view 520 allows a user to provide additional information regarding an example credit account (e.g., inputting an annual percentage rate (APR)). Similarly, view 530 allows a user to provide additional information regarding an example mortgage account (e.g., an estimate current home value) and also prompts several questions to the user regarding the mortgage account.

In some embodiments, the user dataset may also include a constraint factor set. The constraint factor set may include information related to certain constraints that the user may require an optimal debt service strategy solution to consider. The constraint factor set may comprise one or more of a budgetary constraint factor, an existing debt constraint factor, and a savings constraint factor. A budgetary constraint factor may define an income for the user, such as an expected gross income over a particular time period (e.g., year, month, etc.). An existing debt constraint factor may define any additional debt service that the user partakes in that is not explicitly defined by an existing account of the user (e.g., a personal cash repayment to a friend over time or other type of non-product debt service). A savings constraint factor may define an amount of available savings (e.g., cash savings, an amount available in one or more savings accounts, etc.) a user is willing to put toward debt service. Together, these various constraint factors may provide a monetary amount (e.g., a monthly amount) which the user is able to dedicate to debt service.

These factors may be used by the debt optimization system 202 as constraints when determining an optimal debt service strategy solution for the user, such that any debt service strategy solutions that are determined for (and recommended to) the user satisfy the constraint factors of the constraint factor set. In this regard, the optimizer model may apply these constraint factors when determining an optimal debt service strategy solution. Additionally, surrogate models may also apply these constraint factors where applicable (e.g., when estimating values such as approval likelihoods, interest rates, and credit lines).

Figure 5D:
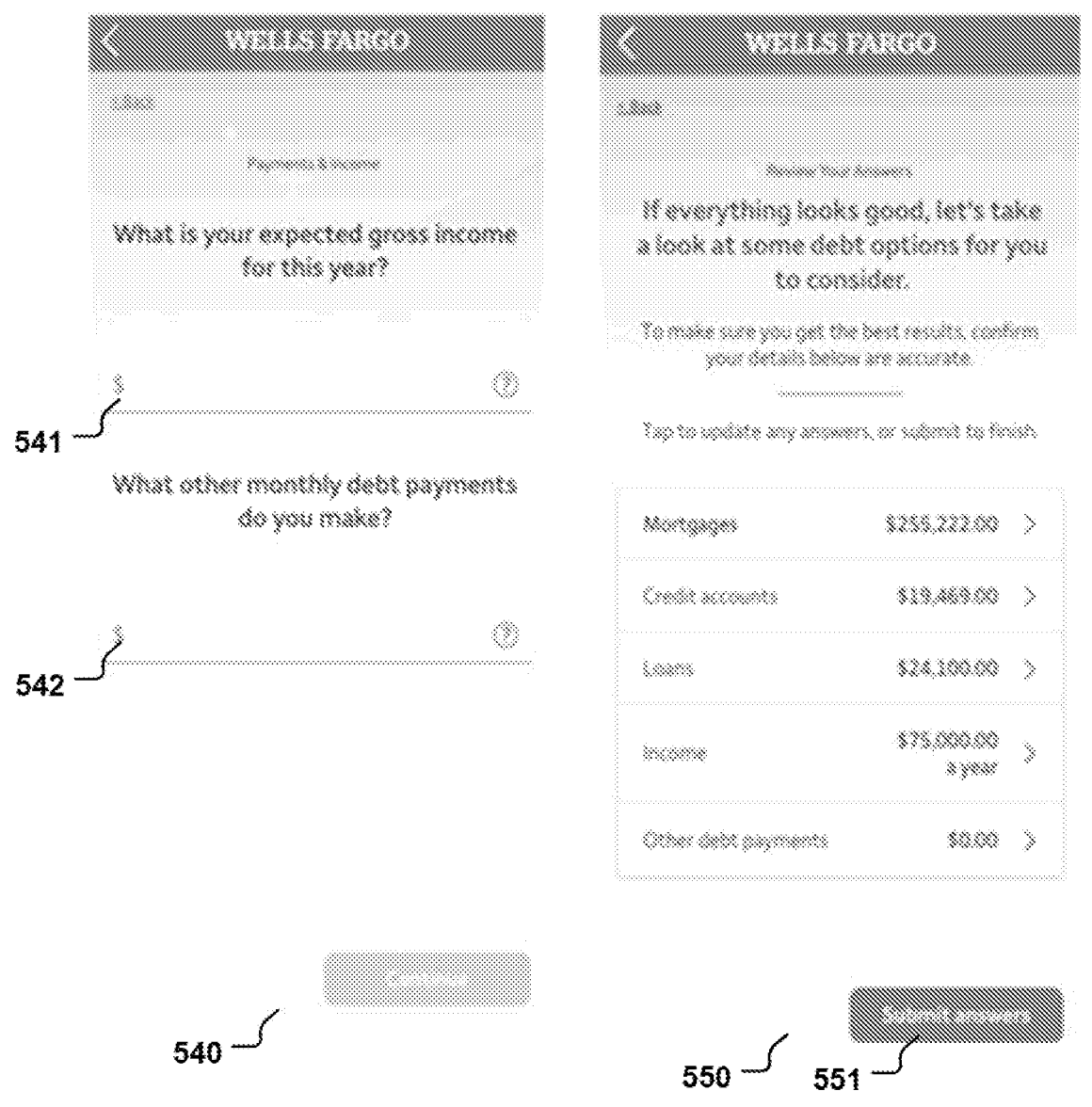

In some embodiments, the user may define constraint factors of the constraint factor set via the UI through a series of one or more views, shown for example in FIG. 5D. As shown, an example view 540 includes several prompts. User input provided to these prompts may define one or more constraint factors. For example, a budgetary constraint factor may be defined based on the user providing their expected gross income to the first prompt 541. An existing debt constraint factor may be defined based on the user providing an amount to the second prompt 542 (e.g., an amount of other monthly debt payments). At view 550, the user may review all information regarding various accounts and constraint factors input via the interactive UI. Upon selecting the button 551, the debt optimization system 202 may begin determining an optimal debt service strategy solution utilizing a suite of surrogate models and an optimizer model, as further described below.

Figure 6:
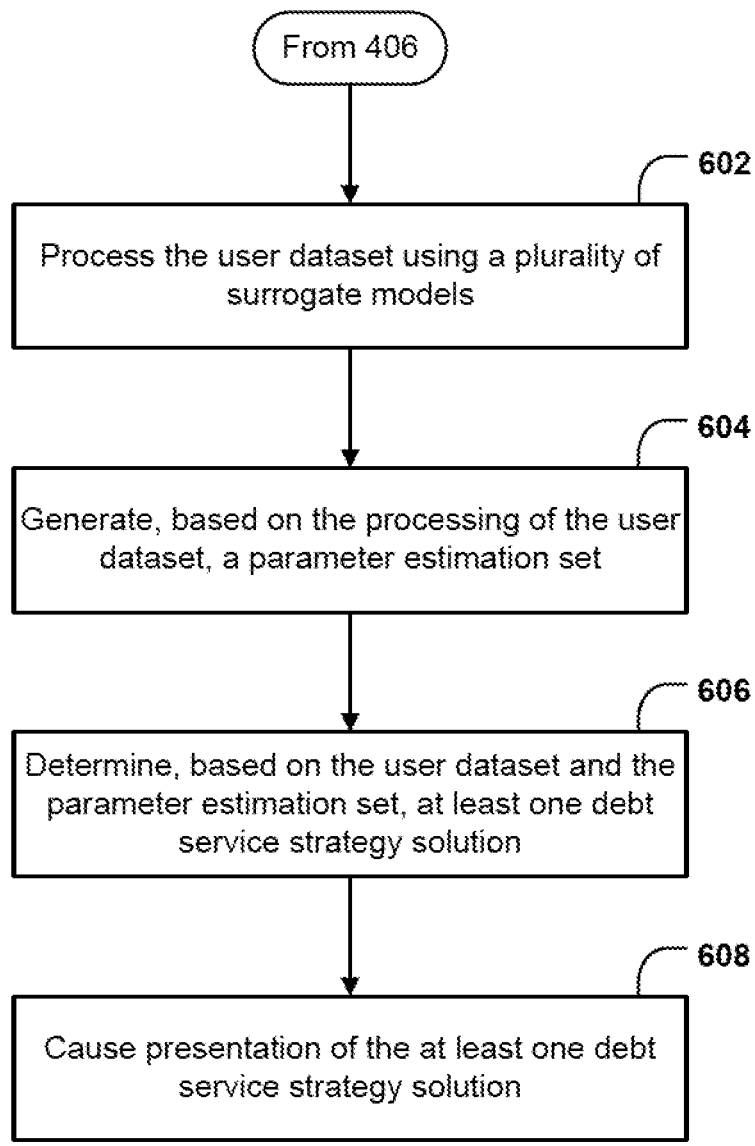
FIG. 6 illustrates an example flowchart for developing an optimized debt service strategy solution utilizing products across multiple product categories, in accordance with some example embodiments described herein.

Turning to FIG. 6, example operations are shown for developing an optimized debt service strategy solution utilizing products across multiple product categories. As shown by operation 602, the apparatus 300 includes means, such as processor 302, memory 304, surrogate modeling circuitry 310, or the like, for processing the user dataset using a plurality of surrogate models.

As noted earlier, the plurality of surrogate models may be categorized into three sub-categories, which include approval likelihood models 108A, interest rate models 108B, credit limit models 108C. These models may be further broken down categorically based on the product they are fit for, i.e., there may be a separate model for each product line, including credit cards, personal loans, and cash-out refinance. In some embodiments, there may be a separate model for each product in each product line. For instance, there may be a model associated with a 30-year fixed mortgage and another model associated with a 15-year fixed mortgage. However, some surrogate models may not be applicable to certain products. For example, estimated interest rates and credit limits may not apply to home loan products. In such cases, values for these parameters may come from non-model sources 110, such as data sources operated by an entity that manages the debt optimization system 202.

The approval likelihood models of the plurality of surrogate models process the user dataset to determine an approval likelihood for a respective product (e.g., how likely it is that the user would be approved for the product). In some embodiments, the approval likelihood models may be logistic regression models (due to the linearity of logistic regression models making them both simple to implement and highly interpretable). However, in some instances, the assumption of linear decision boundaries in training data for the approval likelihood models may be too strong (e.g., in home lending data), posing a challenge for applying logistic regression. However, by training a shallow decision tree as a binary classifier for approval prediction, well-defined cut-off criteria is applied to approvability across the three lines of business (credit cards, personal loans, home loans), for example, based on a FICO score (e.g., a rejection when the FICO score is below 620) or debt-to-income ratio (DTI) (e.g., in home lending, in an instance in which DTI is greater than 50%). Such cut-off criteria may be hard-coded into the approval likelihood models to mitigate the risk of producing a false expectation of approval where approval is highly unlikely. For data space beyond partitions defined by the cut-off criteria, logistic regression may be applied.

The interest rate models of the plurality of surrogate models process the user dataset to determine estimated interest rates for respective products across product lines. To keep interpretability high, the interest rate models may be linear models. However, to address a key model risk related to interest rates (e.g., underestimation of the interest rate), the interest rate models may be estimated using a quantile loss function instead of ordinary least squares (OLS) regression, and the model may be fitted to the eightieth percentile of interest rates. In this manner, only twenty percent of errors should be above a predicted interest rate.

The credit limit models of the plurality of surrogate models process the user dataset to determine estimated amount of credit (e.g., size of the credit line) for respective products across product lines. To keep interpretability high, the credit limit models may be linear models. However, to address a key model risk related to interest rates (e.g., overestimation of the line size), the credit limit models may be estimated using a quantile loss function instead of ordinary least squares (OLS) regression, and the model may be fitted to the twentieth percentile of sizes. In this manner, only twenty percent of errors should be below a predicted credit line size.

As shown by operation 604, the apparatus 300 includes means, such as processor 302, memory 304, surrogate modeling circuitry 310, or the like, for generating, based on the processing of the user dataset, a parameter estimation set. As noted above, the parameter estimation set may comprise a plurality of estimated values for financial parameters of a plurality of products across product lines as they relate to the particular user. For example, the parameter estimation set may include estimated interest rates for different products (e.g., credit cards, personal loans) the user could expect to be assigned if the user applied for the respective product, as determined by the interest rate models described above. The parameter estimation set may also include estimated credit limits (e.g., credit line sizes) the user could expect to be assigned, as determined by the credit limit models described above. Limits for personal loans and home loans may also be included in the parameter estimation set (as acquired from the non-model sources as described above). Further, the parameter estimation set may include values representing approval likelihoods for all available products.

As shown by operation 606, the apparatus 300 includes means, such as processor 302, memory 304, surrogate modeling circuitry 310, or the like, for determining, by optimizer modeling circuitry and based on the user dataset and the parameter estimation set, at least one debt service strategy solution. The at least one debt service strategy solution may include at least one product of a first product category from a plurality of products associated with multiple product categories. That is, a debt service strategy solution may comprise a recommendation for a user to obtain a particular product (selected from a plurality of products across multiple product categories) in order to use that product to manage their debt obligations.

To determine an optimal debt service strategy solution, the parameter estimation set (once generated) and the user dataset may be passed as inputs to an optimizer model, which then solves for a lowest cost (e.g., a lowest cost to the user) solution for the user where the decision variables are the payments made and the principal on the product. In this regard, the optimizer model may utilize the user's existing products (e.g., existing debt obligations, as defined by the user dataset) and constraint factors (e.g., a monthly payment budget) as main inputs to find potential new product offerings that can replace or partially pay off the existing debt products in order to reduce the total loan repayment cost. This cost may be defined as the total monetary amount that should be paid throughout the length of all debt obligations in order to fully pay off the debt obligations.

In some instances, such as when existing debt products have a higher credit limit than their current outstanding principal, the optimizer model may treat that existing debt product as a potential credit product that can be leveraged to pay off other debts. For example, this situation may be possible for debt products such as credit cards and home equity line of credits (HELOC). In this regard, the user may receive guidance in the form of a debt service strategy solution that doesn't require additional new products.

In instances in which the user provides a monthly budget as a constraint factor, the monthly budget may be used as an upper limit on the total amount the user is willing or able to pay for all debt obligations including any potential new products. In instances in which the monthly budget is higher than the total monthly payment on all existing debts, the optimizer model may attempt to find more cost-effective options. If this process fails, the optimizer model may return the unmodified existing debt products as the debt service strategy solution, i.e., the best possible option that can satisfy the monthly budget constraint factor. However, if the user reduces the monthly budget constraint factor to less than a current total month payment, the optimizer model is configured to find a new option that can satisfy the monthly budget constraint factor. In some instances, this may result in the optimizer model recommending debt service strategy solutions with higher overall repayment cost compared to the initial case (e.g., negative savings), as this may be the most effective route given the new monthly budget constraint factor. In this scenario, the optimizer model may only output new product options with lower total costs relative to initial debts (e.g., positive savings).

Figure 7:
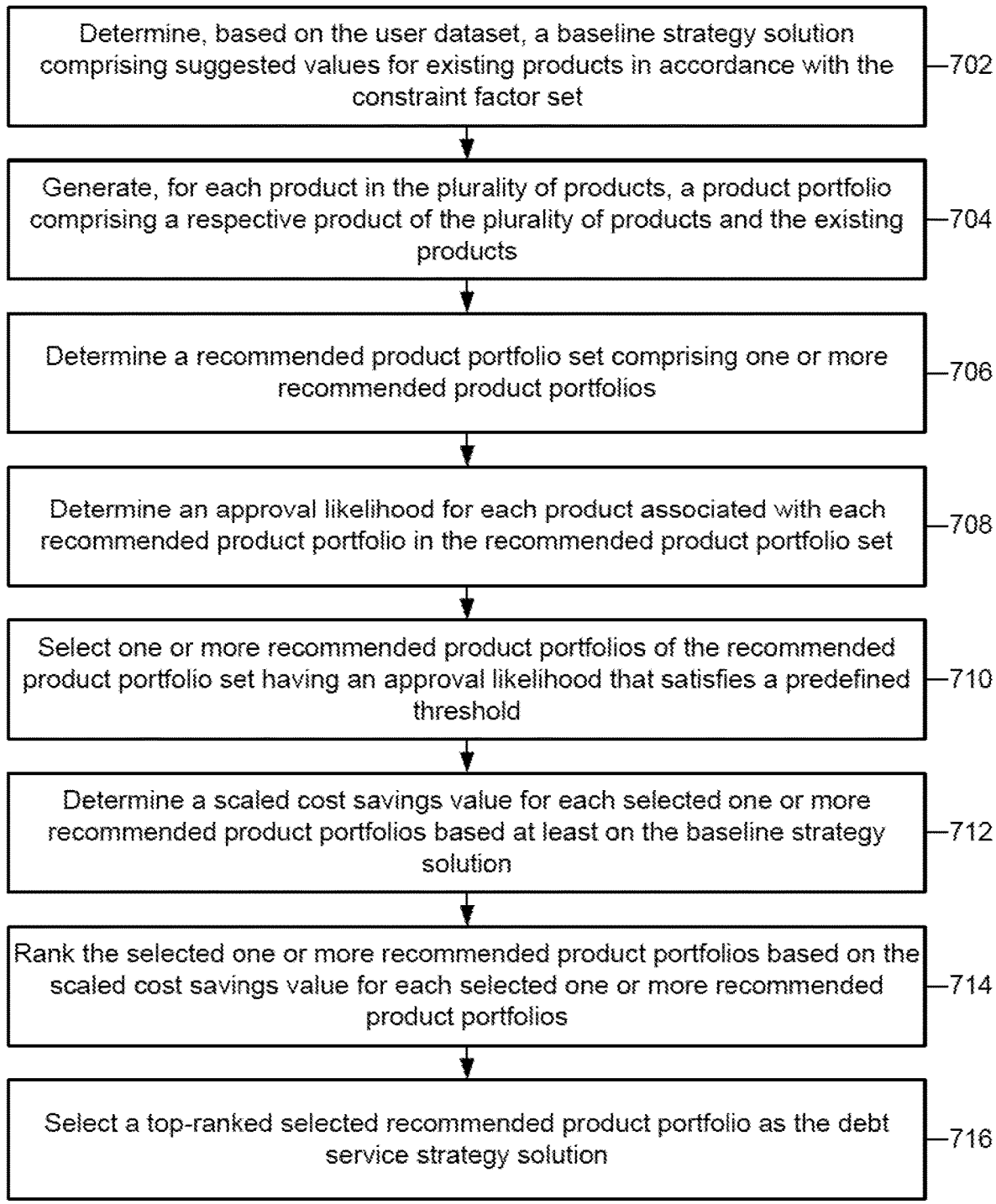
FIG. 7 illustrates an example flowchart for determining at least one debt service strategy solution, in accordance with some example embodiments described herein.

Turning to FIG. 7, example operations for determining at least one debt service strategy solution are shown. As noted above, the optimizer model may determine one or more debt service strategy solutions using the parameter estimation set and the user dataset as inputs to the optimizer model.

As shown by operation 702, the apparatus 300 includes means, such as processor 302, memory 304, optimizer modeling circuitry 312, or the like, for determining, based on the user dataset, a baseline strategy solution comprising suggested values for existing products in accordance with a constraint factor set. In this regard, a cost associated with an existing set of debt products for the user may not be an ideal basis for measuring new product savings (e.g., due to the cost structure not being an optimal cost structure). Instead, the optimizer model first generates a baseline strategy solution using the existing debt products only and without considering new product options. The resulting baseline strategy solution thus includes optimal suggested values of monthly payments and repayment lengths for the existing debt products, subject to the constraint factor set (e.g., a monthly budget of the user). In some embodiments, if the monthly budget constraint factor is higher than a current total monthly payment on existing debt products, the optimizer model attempts to distribute the difference between existing debt payments in a way that provide cost savings to the user. Moreover, if any of the existing debt products (such as credit cards or HELOC) have additional credit available that can be leveraged to pay off other existing debts, the optimizer model would evaluate if using that credit to do so would result in reduced overall cost.

The determination of the baseline strategy solution and its use over an existing solution (e.g., how the user's debt is currently structured and how the user is currently paying off their debts) is important. For example, for some existing debt products such as credit cards, the reported monthly payment by the user may be too low for paying off the debt within a reasonable timeframe. This may result in a very high repayment cost, which can impact the type of products recommended by the optimizer model as well as their potential savings.

Additionally, constraint factors such as a monthly budget specified by the user are also taken into account when establishing the baseline strategy solution from which debt service strategy solutions including product recommendation savings are determined. For example, consider an example situation wherein the total monthly payment for existing debts is $1,500.00 and the user specified a monthly budget of $2,000.00. In this example, the optimizer model may leverage all the $2,000.00 monthly budget while trying to find best new products. The potential savings of any new product identified should not be compared with the cost of existing debts because the model may have used all or portion of the additional $500.00 toward interest payments in order to bring the cost down. Therefore, a fair comparison can be made by applying the new budget toward the payments of existing debts (without adding any new products), and use the cost of the modified existing debts as the baseline for evaluating the savings of any new potential product offerings.

The choice of using an optimized baseline strategy solution for calculating potential product savings (over existing solutions) will result in more conservative saving values for recommended products. This may be preferred, as not doing so may result in overestimating the value of new products and thus providing users with debt service strategy solutions that may not be in their best interest.

As shown by operation 704, the apparatus 300 includes means, such as processor 302, memory 304, optimizer modeling circuitry 312, or the like, for generating, for each product in the plurality of products, a product portfolio comprising (i) a respective product of the plurality of products and (ii) the existing products. In this regard, each product that is available may be added to the user's existing debt products to generate separate product portfolios. For example, a first type of credit card (e.g., "Credit Card A") may be included in a first product portfolio that also includes the user's existing debt products (e.g., "Debt Product A" and "Debt Product B"). Similarly, a second type of credit card (e.g., "Credit Card B") may be included in a second product portfolio that also includes Debt Product A and Debt Product B. As mentioned above, the products may be across product categories. In this regard, a third product portfolio may be generated that includes a personal loan ("Personal Loan A") as well as Debt Product A and Debt Product B.

As shown by operation 706, the apparatus 300 includes means, such as processor 302, memory 304, optimizer modeling circuitry 312, or the like, for determining a recommended product portfolio set comprising one or more recommended product portfolios. In this regard, once product portfolios have been generated for each available product, the optimizer model may then iterate through the product portfolios in order to find optimized values depending on properties of the newly added product. For example, for each product portfolio, the optimizer model may determine optimized values, such as a suggested principal, suggested monthly payment, suggested payoff length, and/or the like. If the optimizer model converges successfully, and the added product is recommended by the optimizer model (i.e., the total repayment cost for the product portfolio is less than the total repayment cost of the baseline strategy solution), the particular product portfolio may be labeled as a recommended product portfolio.

In some embodiments, for example, if none of the product portfolios result in a total repayment cost being less than the total repayment cost of the baseline strategy solution, the debt optimization system 202 may select the baseline strategy solution as the debt service strategy solution. Said differently, instead of recommending additional products, the debt optimization system 202 may instead recommend adjustments to the user's existing debt products, which may include optimized values for loan terms, principal, and monthly payments.

As shown operation 708, the apparatus 300 includes means, such as processor 302, memory 304, surrogate modeling circuitry 310, or the like, for determining an approval likelihood for each product associated with each recommended product portfolio in the recommended product portfolio set. In this regard, added products of the recommended product portfolios are provided to a corresponding approval likelihood model of the plurality of surrogate models to determine a better estimate of the likelihood of approval for the product, now given the suggested principal determined by the optimizer model. By doing so, each recommended product portfolio may then be assigned an approval likelihood (based on the approval likelihood determine for the respective products).

As shown operation 710, the apparatus 300 includes means, such as processor 302, memory 304, optimizer modeling circuitry 312, or the like, for selecting one or more recommended product portfolios of the recommended product portfolio set having an approval likelihood that satisfies a predefined threshold. For example, once the recommended product portfolios are assigned approval likelihoods, the debt optimization system 202 may select recommended product portfolios having approval likelihoods exceeding a predefined percentage (e.g., greater than 90% approval likelihood). In some embodiments, instead of a predefined threshold (or if none of the recommended product portfolios have an approval likelihood satisfying the predefined threshold), the debt optimization system 202 may select a predefined number of recommended product portfolios having the highest approval likelihoods.

As shown by operation 712, the apparatus 300 includes means, such as processor 302, memory 304, optimizer modeling circuitry 312, or the like, for determining a scaled cost savings value for each selected one or more recommended product portfolios based at least on the baseline strategy solution. To determine a scaled cost savings value for a respective selected recommended product portfolio, a cost savings value (e.g., the total repayment cost for the selected recommended product portfolio subtracted from the total repayment cost of the baseline strategy solution) for a respective selected recommended product portfolio may be multiplied by the approval likelihood for the respective selected recommended product portfolio.

As shown by operation 714, the apparatus 300 includes means, such as processor 302, memory 304, optimizer modeling circuitry 312, or the like, for ranking the selected one or more recommended product portfolios based on the scaled cost savings value for each selected one or more recommended product portfolios. For example, the selected recommended product portfolios may be rank-ordered according to their scaled cost savings values (e.g., in order from highest scaled cost savings value to lowest scaled cost savings value). One or more selected recommended product portfolios may then be selected from the ordering. For example, a top-ranked selected recommended product portfolio may be selected to be the debt service strategy solution for the particular user, as that particular product portfolio has the greatest cost savings to the user from all other product portfolios. In this regard, as shown by operation 716, the apparatus 300 includes means, such as processor 302, memory 304, optimizer modeling circuitry 312, or the like, for selecting a top-ranked selected recommended product portfolio as the debt service strategy solution. Additionally, the debt optimization system 202 may also select one or more additional selected recommended product portfolio (e.g., the second and third-ranked product portfolios) to as alternative debt service strategy solutions for the user.

Returning to FIG. 6, as shown by operation 608, the apparatus 300 includes means, such as processor 302, memory 304, communications hardware 306, or the like, for causing presentation of the at least one debt service strategy solution. In some embodiments, causing presentation of the at least one debt service strategy solution may include causing display of the at least one debt service strategy solution via the interactive UI.

Figure 8A:
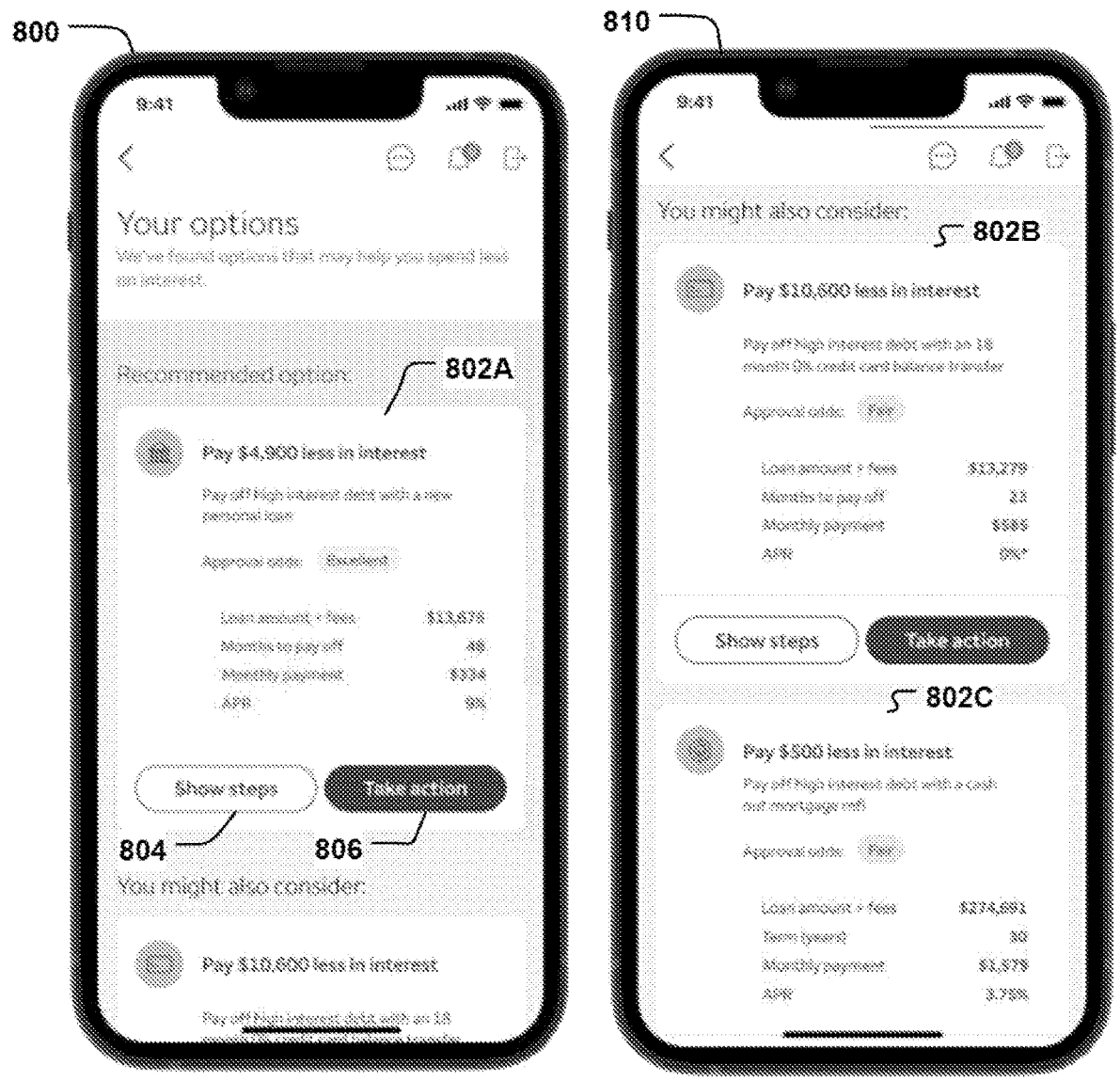
Figure 8B:
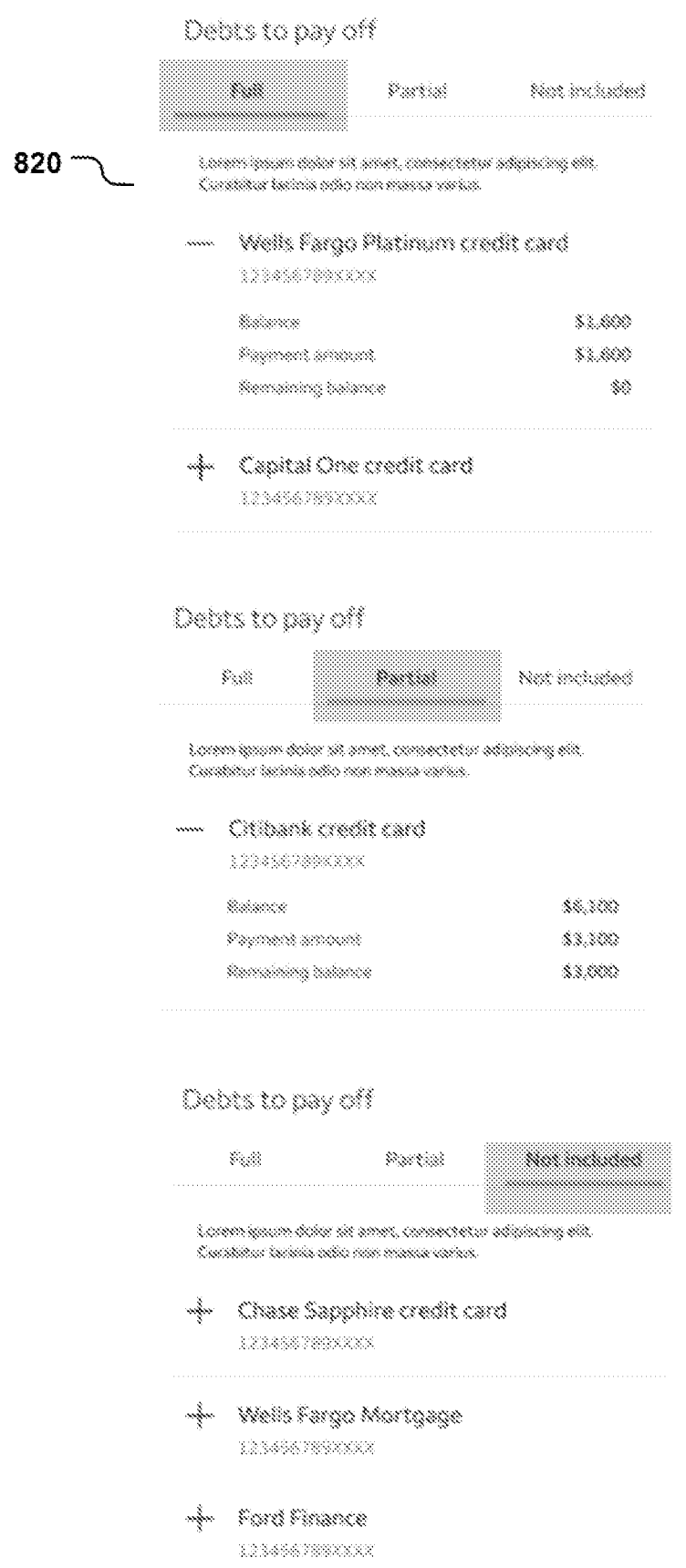
Figure 8C:
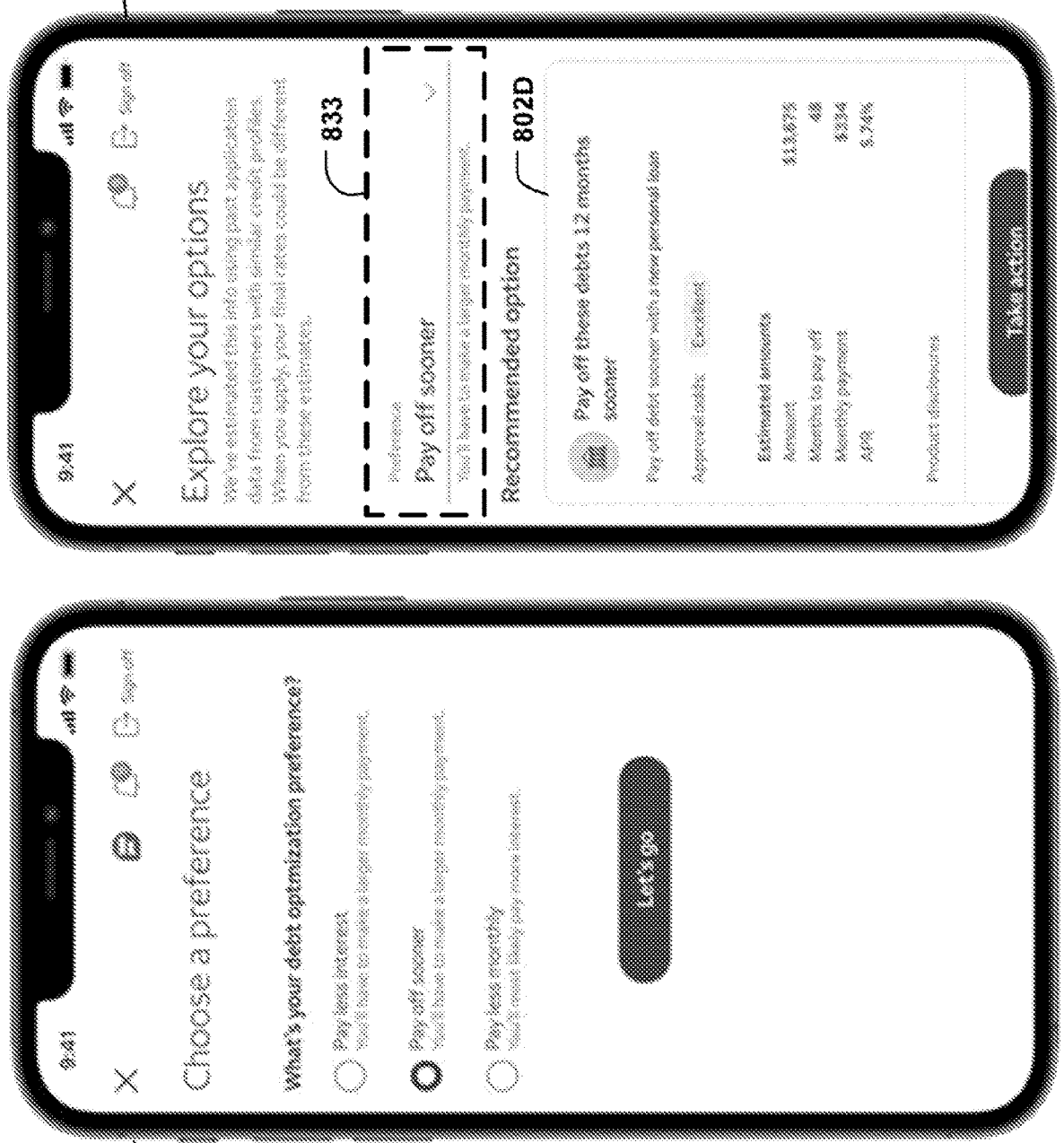

Turning to FIGS. 8A, 8B and 8C, example views of the interactive UI are shown which may be displayed following a determination of a debt service strategy solution by the debt optimization system 202. As shown in FIG. 8A, a view 800 provides the user with information which may have factored into the determination of the debt service strategy solution. In some embodiments a link and/or button (not shown) (e.g., an "Edit Input Information and/or Preferences" link and/or button) may be displayed that, when selected, allows the user to modify various information about their accounts and/or preferences with regard to optimizing the user's debt. Following modification, the debt optimization system 202 may re-perform various operations of FIGS. 6 and 7 using an updated user dataset that includes any changes the user made in order to determine an updated debt strategy solution.

As shown in view 800, the debt service strategy solution may be presented visually as a visual summary card 802A. The visual summary card comprises information associated with a respective debt service strategy solution, such a recommended new product (e.g., a personal loan as shown on visual summary card 802A), approval odds for the new product (e.g., based on the determined approval likelihood as described above), as well as optimal values as determined by the optimizer model, such as loan amount, months to pay off, monthly payment, and/or the like.

In some embodiments, one or more alternative debt service strategy solutions may also be displayed, as shown in view 810. The alternative debt service strategy solutions may also be presented visually as a visual summary cards. For example, view 810 includes a first visual summary card 802B and a second visual summary card 802C associated with respective alternative debt service strategy solutions for the user to consider. The alternative debt service strategy solutions may include recommendations for products in different categories (e.g., a cash out mortgage refinancing as shown in visual summary card 802C and a credit card as shown in visual summary card 802B) or different products in the same product line (e.g., a first credit card for a first debt service strategy solution and a second credit card for a second debt service strategy solution).

In some embodiments, a visual summary card may comprise a link 804 which, when selected, causes the interactive UI to display additional information about the debt service strategy solution. In some embodiments, the additional information may be shown in a new view, such as view 820 as shown in FIG. 8B. As shown, view 820 may include additional information related to the various accounts belonging to the user (e.g., which debts to pay off partially or completely).

In some embodiments, a visual summary card (e.g., 802A-802D may comprise an interactive link 806 (e.g., a "take action" button) that, when selected, is configured to cause the interactive UI to cause presentation of a product page associated with the respective debt service strategy solution. The user may select the interactive link 806 to be connected to next steps on opening or applying for the recommended product of the debt service strategy solution presented on the visual summary card. For instance, the interactive link 806 may cause a product page (e.g., a webpage of a bank associated with a credit card, personal loan, or other product) to be displayed such that the user can conveniently begin the process of applying for the product.

Turning now to FIG. 8C, FIG. 8C shows a view 820 resulting from a user selecting the link and/or button (not shown in FIG. 8A) that allows the user to modify various preferences with regard to optimizing the user's debt. As shown in view 820, the user is presented with options (e.g., the three options of "pay less interest", "pay off sooner", and "pay less monthly" shown in FIG. 8C) as to how the user wishes to optimize his/her debt. Selecting one of these options (e.g., the "pay off sooner" option that is selected in view 820) may result in view 830 where a new visual summary 802D comprising yet another alternative for a debt service strategy solution (e.g., a different personal loan solution as shown in visual summary 802D of FIG. 8C) is generated and provided to the user based on the user's preference in optimizing his/her debt. In some embodiments, after reviewing the presented visual summary 802D, the user may select a different option as to how the user wishes to optimize his/her debt via a dropdown menu 833. The dropdown menu may include the same options shown in view 820 (e.g., the three options of "pay less interest", "pay off sooner", and "pay less monthly"). Though illustrated as a dropdown menu in FIG. 8C, it is to be appreciated that these options may be visually presented in various manners. For instance, each option may be visually presented as a selectable image, rather than a dropdown menu, that, once selected, causes presentation of a respective visual summary associated with the option. In some embodiments, rather than generating a new visual summary 802D, the system may select one of the already generated visual summaries 802A-802C that best fits the user's selected debt optimization preference when an option is selected. For example, as shown in view 830 of FIG. 8C, visual summary 802A is selected and presented to the user (with minor modifications to a description of the visual summary 802A where the description of "Pay $4,900 less in interest" is replaced with "Pay off these debts 12 months sooner") as the debt service strategy solution that allows the user to "pay [debt] off sooner."

Figure 9A:
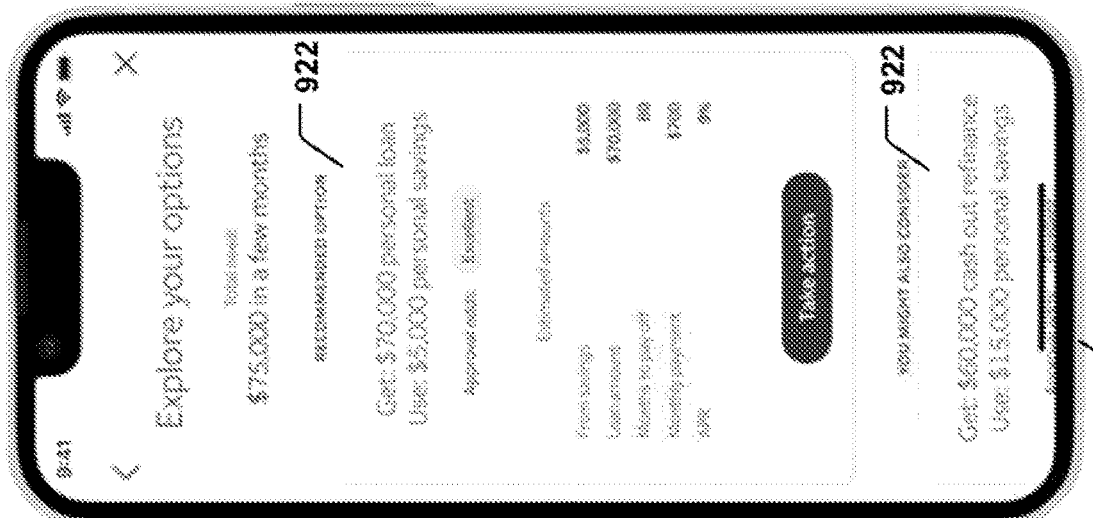
FIGS. 9A and 9B illustrate example views of an interactive user interface, in accordance with some example embodiments described herein.
Figure 9A:
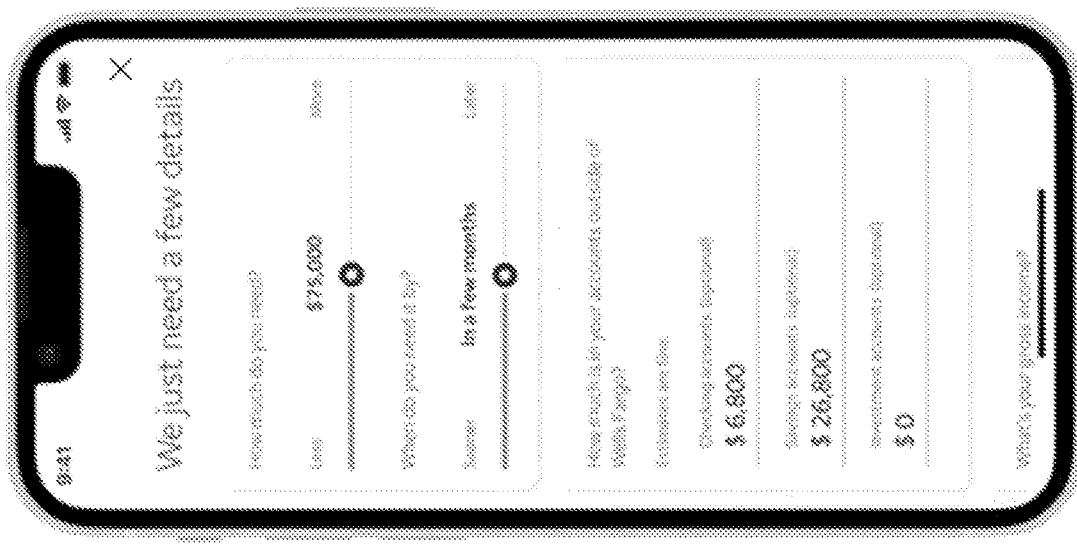
Figure 9A:
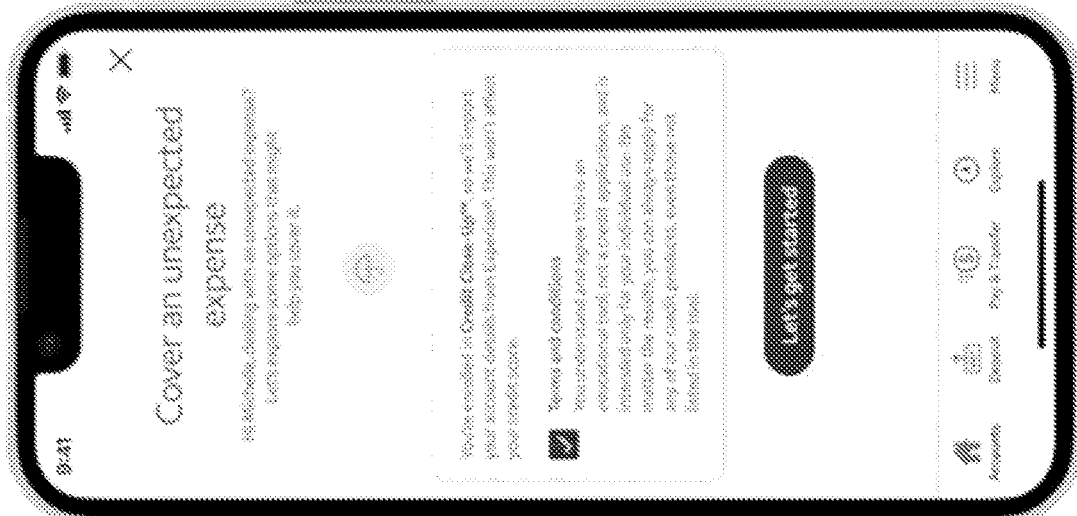
Figure 9B:
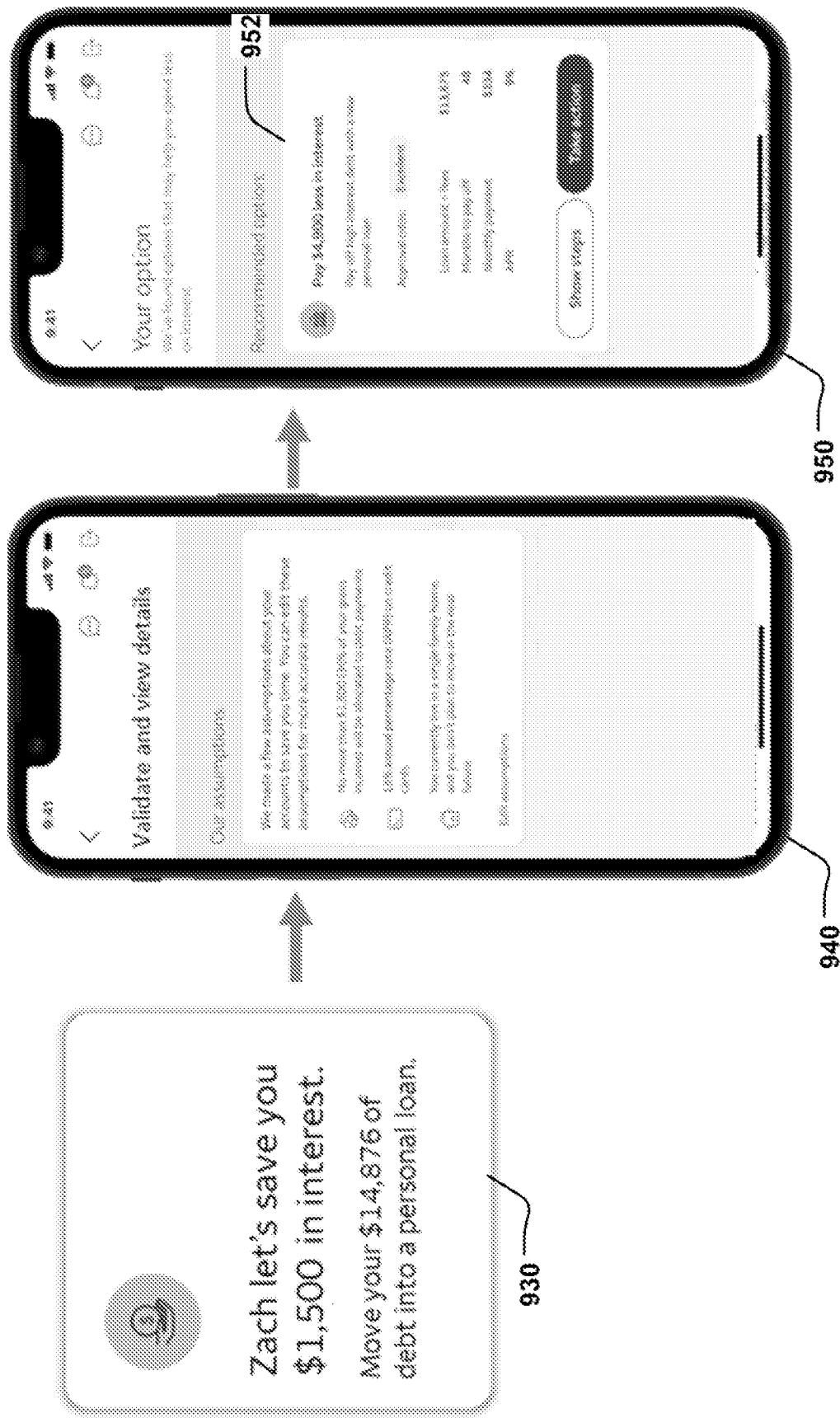

FIGS. 9A and 9B show example views of an interactive user interface generated based on alternative methods for acquiring various user data of a user dataset. More specifically, FIG. 9A shows a view 900 (similar to views 500 and 501 shown in FIGS. 5A and 5B, respectively) at the beginning of the digital user experience. View 900 may be initiated in response to the user wishing to explore options (e.g., a debt service strategy solution) for covering one or more unexpected expenses incurred by the user (e.g., home repair expenses as a result of an unexpected broken pipe, unexpected medical expenses, etc.). Similar to views 510, 520, and 530 of FIG. 5C, view 910 of FIG. 9A allows the user to customize one or more constraint factor sets (e.g., the sliding bars at the top of view 910 where the user is able to set an amount needed and when the amount is needed by) and provide additional information (e.g., amounts stored in external accounts, other products to include or exclude as discussed above in reference to the description of FIG. 5C, etc.). Finally, similar to view 800 of FIG. 8A, a view 920 is generated providing the user with one or more visual summary cards 922 (e.g., similar to visual summary cards 802A-802D of FIGS. 8A-8C) including one or more debt service strategy solutions for covering the user's unexpected expense(s).

Finally, turning to FIG. 9B, FIG. 9B shows yet another view 930 that can be presented to the user at the beginning of the digital user experience. In particular, view 930 may be automatically generated by the system 930 in response to the system automatically determining (e.g., without user intervention and using data retrieved from one or more credit check services such as Credit Close-Up$^{SM}$ and/or other sources such as the user's credit bureau data) that the user may benefit (e.g., save on interest that the user is currently paying) from one or more debt service strategy solutions. As shown in FIG. 9B, view 930 shows the user (e.g., Zach) that fifteen hundred dollars ($1,500) in interest may be saved if Zach takes action on one or more debt service strategy solutions. A brief summary of how Zach is able to save $1500 in interest is also provided in view 930 to incentivize Zach to move forward with the digital user experience. If Zach chooses to move forward with the digital user experience, a subsequent view 940 is presented to show Zach what data (e.g., information on one or more of Zach's financial products, constraint factors, etc.) was used to generate the information presented in view 930. At this point, Zach may validate and modify these details (e.g., using the "Edit Assumptions" option) as necessary to ensure that the details are accurate. Finally, similar to view 800 of FIG. 8A, a view 950 is generated providing Zach with a single visual summary card 952 (e.g., similar to visual summary cards 802A-802D of FIGS. 8A-8C) including a service strategy solution for helping Zach save $1500 in interest as advertised in view 930.

As described in greater detail above, example embodiments provide efficient and effective determination of an optimized debt service strategy solution utilizing products across multiple product categories. The solutions described above address the technical challenge of delivering high quality and bespoke debt management strategies and cross-product recommendations at scale to the mass market. In doing so, example embodiments produce technical benefits, such as the ability to deliver debt management solutions (and product recommendations) in real-time in a self-service implementation (e.g., via an interactive user interface). Another technical benefit is the ability to provide high quality recommendations for various products across a plurality of product categories. Rather than simply recommending a particular product offered across different lenders as seen in traditional experiences, example embodiments can provide debt service strategy solutions that include recommendations for products across a wide range of categories while also addressing various constraints and needs of individual users, thereby providing the user with the most optimal debt service strategy solution for their individual circumstances in an automated fashion.

FIGS. 4, 6, and 7 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for developing an optimized debt service strategy solution utilizing products across multiple product categories and multiple entities, the method comprising:
 receiving, by communications hardware from a plurality of remote servers via a network interface, (i) user financial information comprising a FICO score or a debt-to-income ratio, and (ii) product information for products offered by the multiple entities, wherein each of the plurality of remote servers is associated with a respective entity of the multiple entities;
 generating, by surrogate modeling circuitry, a user dataset by inputting, at least in part, the user financial information into a plurality of surrogate models comprising an interest rate model and an approval likelihood model;
 generating, by the surrogate modeling circuitry and based on the user dataset, a parameter estimation set;
 determining, by optimizer modeling circuitry and based on the product information, the user dataset, and the parameter estimation set, a respective debt service strategy solution for each respective entity, wherein the respective debt service strategy solution comprises at least one product of a first product category from a plurality of products associated with the multiple product categories, wherein determining the respective debt service strategy solution for each respective entity comprises:
  determining, by the optimizer modeling circuitry and based on the user dataset, a baseline strategy solution comprising suggested values for existing products of a user in accordance with a constraint factor set,
  generating, by the optimizer modeling circuitry and for each product in the plurality of products, a product portfolio comprising (i) a respective product of the plurality of products and (ii) the existing products,
  determining, by the optimizer modeling circuitry and using the interest rate model, a recommended product portfolio set comprising one or more recommended product portfolios, wherein each recommended product portfolio has a respective cost savings value that is equal to, or greater than, the baseline strategy solution,
  determining, by the surrogate modeling circuitry and using the approval likelihood model, an approval likelihood for each product associated with each recommended product portfolio based, at least in part, on the user financial information,
  determining, by the optimizer modeling circuitry, a respective scaled cost savings value for each of the one or more recommended product portfolios by multiplying the respective cost savings value by a respective approval likelihood,
  ranking, by the optimizer modeling circuitry, the one or more recommended product portfolios based on the respective scaled cost savings value for each of the one or more recommended product portfolios, and
  selecting, by the optimizer modeling circuitry, a top-ranked recommended product portfolio as the respective debt service strategy solution for each respective entity; and
 causing presentation, by the communications hardware, of the respective debt service strategy solution for each respective entity via an interactive user interface by:
  simultaneously causing display of a first interactive data element associated with a first debt service strategy solution of a first entity in a first portion of the interactive user interface, wherein the first interactive data element comprises a first link to a first webpage of the first entity, and a second interactive data element associated with a second debt service strategy solution of a second entity in a second portion of the interactive user interface, wherein the second interactive data element comprises a second link to a second webpage of the second entity.

2. The method of claim 1,
 wherein the user dataset comprises the constraint factor set comprising at least one of: a budgetary constraint factor, an existing debt constraint factor, and a savings constraint factor,
 wherein the respective debt service strategy solution for each respective entity is determined such that the respective debt service strategy solution for each respective entity satisfies constraint factors of the constraint factor set.

3. The method of claim 1, wherein the plurality of surrogate models comprise an approval likelihood surrogate model set, an interest rate surrogate model set, and a credit limit surrogate model set.

4. The method of claim 3, wherein each of the approval likelihood surrogate model set, the interest rate surrogate model set, and the credit limit surrogate model set comprise a respective plurality of models trained to predict an estimated value for a respective product.

5. The method of claim 1, further comprising:
 generating, by interface generation circuitry, the interactive user interface comprising a plurality of interactive data elements,
 wherein at least a portion of the user dataset is received based on user interactions with the plurality of interactive data elements.

6. The method of claim 1, wherein the respective debt service strategy solution for each respective entity is displayed via the interactive user interface, as one or more visual summary cards, wherein a respective visual summary card comprises information associated with the respective debt service strategy solution for each respective entity.

7. The method of claim 6, wherein the respective visual summary card further comprises an interactive link that, when selected, is configured to cause the interactive user interface to cause presentation of a product page associated with the respective debt service strategy solution for each respective entity.

8. The method of claim 1, wherein the approval likelihood model comprises a logistic regression model and a shallow decision tree,
 wherein the method further comprises:
  training the shallow decision tree as a binary classifier for approval predictions of the logistic regression model.

9. An apparatus for developing an optimized debt service strategy solution utilizing products across multiple product categories and multiple entities, the apparatus comprising:
communications hardware configured to receive, from a plurality of remote servers via a network interface, (i) user financial information comprising a FICO score or a debt-to-income ratio, and (ii) product information for products offered by the multiple entities, wherein each of the plurality of remote servers is associated with a respective entity of the multiple entities;
surrogate modeling circuitry configured to:
generate a user dataset by inputting, at least in part, the user financial information into a plurality of surrogate models comprising an interest rate model and an approval likelihood model, and
generate, based on the user dataset, a parameter estimation set; and
optimizer modeling circuitry configured to determine, based on the product information, the user dataset, and the parameter estimation set, a respective debt service strategy solution for each respective entity, wherein the respective debt service strategy solution comprises at least one product of a first product category from a plurality of products associated with the multiple product categories, wherein determining the respective debt service strategy solution for each respective entity comprises:
determining, based on the user dataset, a baseline strategy solution comprising suggested values for existing products of a user in accordance with a constraint factor set,
generating, for each product in the plurality of products, a product portfolio comprising (i) a respective product of the plurality of products and (ii) the existing products,
determining, using the interest rate model, a recommended product portfolio set comprising one or more recommended product portfolios, wherein each recommended product portfolio has a respective cost savings value that is equal to, or greater than, the baseline strategy solution,
determining, using the approval likelihood model, an approval likelihood for each product associated with each recommended product portfolio based, at least in part, on the user financial information,
determining a respective scaled cost savings value for each of the one or more recommended product portfolios by multiplying the respective cost savings value by a respective approval likelihood,
ranking the one or more recommended product portfolios based on the respective scaled cost savings value for each of the one or more recommended product portfolios, and
selecting a top-ranked recommended product portfolio as the respective debt service strategy solution for each respective entity,
wherein the communications hardware is further configured to cause presentation of the respective debt service strategy solution for each respective entity via an interactive user interface by:
simultaneously causing display of a first interactive data element associated with a first debt service strategy solution of a first entity in a first portion of the interactive user interface, wherein the first interactive data element comprises a first link to a first webpage of the first entity, and a second interactive data element associated with a second debt service strategy solution of a second entity in a second portion of the interactive user interface, wherein the second interactive data element comprises a second link to a second webpage of the second entity.

10. The apparatus of claim 9,
wherein the user dataset comprises the constraint factor set comprising at least one of: a budgetary constraint factor, an existing debt constraint factor, and a savings constraint factor,
wherein the optimizer modeling circuitry determines the respective debt service strategy solution for each respective entity such that the respective debt service strategy solution for each respective entity satisfies constraint factors of the constraint factor set.

11. The apparatus of claim 9, wherein the plurality of surrogate models comprise an approval likelihood surrogate model set, an interest rate surrogate model set, and a credit limit surrogate model set.

12. The apparatus of claim 11, wherein each of the approval likelihood surrogate model set, the interest rate surrogate model set, and the credit limit surrogate model set comprise a respective plurality of models trained to predict an estimated value for a respective product.

13. The apparatus of claim 9, further comprising:
interface generation circuitry configured to generate the interactive user interface comprising a plurality of interactive data elements,
wherein the communications hardware receives at least a portion of the user dataset based on user interactions with the plurality of interactive data elements.

14. The apparatus of claim 9, wherein the respective debt service strategy solution for each respective entity is displayed via the interactive user interface as one or more visual summary cards, wherein a respective visual summary card comprises information associated with the respective debt service strategy solution for each respective entity.

15. The apparatus of claim 14, wherein the respective visual summary card further comprises an interactive link that, when selected, is configured to cause the interactive user interface to cause presentation of a product page associated with the respective debt service strategy solution.

16. A computer program product for developing an optimized debt service strategy solution utilizing products across multiple product categories and multiple entities, the computer program product comprising at least one non-transitory computer-readable storage medium storing software instructions that, when executed, cause an apparatus to:
receive, from a plurality of remote servers via a network interface, (i) user financial information comprising a FICO score or a debt-to-income ratio, and (ii) product information for products offered by the multiple entities, wherein each of the plurality of remote servers is associated with a respective entity of the multiple entities;
generate, a user dataset by inputting, at least in part, the user financial information into a plurality of surrogate models comprising an interest rate model and an approval likelihood model;
generate, based on the user dataset, a parameter estimation set;
determine, based on the product information, the user dataset, and the parameter estimation set, a respective debt service strategy solution for each respective entity, wherein the respective debt service strategy solution comprises at least one product of a first product category from a plurality of products associated with the multiple product categories, wherein determining the respective debt service strategy solution for each respective entity comprises:
  determining, based on the user dataset, a baseline strategy solution comprising suggested values for existing products of a user in accordance with a constraint factor set,
  generating, for each product in the plurality of products, a product portfolio comprising (i) a respective product of the plurality of products and (ii) the existing products,
  determining, using the interest rate model, a recommended product portfolio set comprising one or more recommended product portfolios, wherein each recommended product portfolio has a respective cost savings value that is equal to, or greater than, the baseline strategy solution,
  determining, using the approval likelihood model, an approval likelihood for each product associated with each recommended product portfolio based, at least in part, on the user financial information,
  determining a respective scaled cost savings value for each of the one or more recommended product portfolios by multiplying the respective cost savings value by a respective approval likelihood,
  ranking the one or more recommended product portfolios based on the respective scaled cost savings value for each of the one or more recommended product portfolios, and
  selecting a top-ranked recommended product portfolio as the respective debt service strategy solution for each respective entity; and
cause presentation of the respective debt service strategy solution for each respective entity via an interactive user interface by:
  simultaneously causing display of a first interactive data element associated with a first debt service strategy solution of a first entity in a first portion of the interactive user interface, wherein the first interactive data element comprises a first link to a first webpage of the first entity, and a second interactive data element associated with a second debt service strategy solution of a second entity in a second portion of the interactive user interface, wherein the second interactive data element comprises a second link to a second webpage of the second entity.

17. The computer program product of claim 16,
  wherein the user dataset comprises the constraint factor set comprising at least one of: a budgetary constraint factor, an existing debt constraint factor, and a savings constraint factor,
  wherein the respective debt service strategy solution for each respective entity is determined such that the respective debt service strategy solution for each respective entity satisfies constraint factors of the constraint factor set.

18. The method of claim 8, wherein the approval likelihood model further comprises a cut-off criteria,
  wherein the method further comprises:
    hard-coding the cut-off criteria into the approval likelihood model, wherein the cut-off criteria is configured to mitigate a false expectation of approval.

19. The method of claim 18, further comprising:
  applying the logistic regression model for data space beyond one or more partitions defined by the cut-off criteria.

20. The method of claim 19, wherein the cut-off criteria comprises a respective predefined threshold for each of the multiple product categories, wherein the multiple product categories comprises two or more of a credit card category, a personal loan category, or a home loan category, wherein the cut-off criteria comprises a predefined FICO score threshold for at least one of the credit card category and the personal loan category, wherein the cut-off criteria comprises a debt-to-income ratio threshold for the home loan category.

* * * * *